US012631236B2

(12) United States Patent
Oomen, Jr. et al.

(10) Patent No.: US 12,631,236 B2
(45) Date of Patent: ***May 19, 2026

(54) HIGH TEMPERATURE, HIGH TORQUE, POLYMERIC ROTATIONAL DAMPENER

(71) Applicant: ILLINOIS TOOL WORKS INC., Glenview, IL (US)

(72) Inventors: Craig Martin Oomen, Jr., Lowell, MI (US); Samuel Smith, Allendale, MI (US); Daniel Lindsey, Tinley Park, IL (US); Steven Bivens, Kankakee, IL (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 560 days.

This patent is subject to a terminal disclaimer.

(21) Appl. No.: 18/105,082

(22) Filed: Feb. 2, 2023

(65) Prior Publication Data

US 2023/0258241 A1 Aug. 17, 2023

Related U.S. Application Data

(60) Provisional application No. 63/313,510, filed on Feb. 24, 2022, provisional application No. 63/311,306, filed on Feb. 17, 2022.

(51) Int. Cl.
*F16F 1/48* (2006.01)

(52) U.S. Cl.
CPC ...................................... *F16F 1/48* (2013.01)

(58) Field of Classification Search
CPC ........ F16F 1/48; F16F 1/3737; F16F 15/1201; F16F 13/04; F16F 2224/025; F16F 2232/02
See application file for complete search history.

(56) References Cited

U.S. PATENT DOCUMENTS

| | | | |
|---|---|---|---|
| 431,124 A | 7/1890 | Rae | |
| 2,407,757 A | 9/1946 | Maccallum | |
| 4,323,994 A | 4/1982 | Coogler | |
| 5,209,461 A * | 5/1993 | Whightsil, Sr. .... | A63B 21/0455 267/155 |
| 5,547,174 A | 8/1996 | Bade et al. | |
| 6,440,044 B1 * | 8/2002 | Francis ................... | E05D 13/10 482/137 |
| 8,176,809 B2 | 5/2012 | Ihrke et al. | |
| 9,079,672 B2 | 7/2015 | Baudasse | |
| 9,234,554 B2 | 1/2016 | Dadd et al. | |
| 10,343,006 B2 | 7/2019 | Francis et al. | |
| 10,808,713 B2 | 10/2020 | Lucchetta et al. | |
| 2002/0096245 A1 * | 7/2002 | Christenson ........ | F16F 15/1435 156/165 |

(Continued)

FOREIGN PATENT DOCUMENTS

| | | |
|---|---|---|
| EP | 0245203 A2 | 11/1987 |
| JP | 6828873 B2 | 2/2021 |

*Primary Examiner* — David R Morris
(74) *Attorney, Agent, or Firm* — Quarles & Brady LLP

(57) ABSTRACT

A rotational spring dampener includes a core having an opening therethrough, a first solid component having a first set of bosses, a second solid component having a second set of bosses, and a tensile member positioned between the first solid component and the second solid component. The tensile member includes a solid silicon polymer.

18 Claims, 22 Drawing Sheets

(56) References Cited

U.S. PATENT DOCUMENTS

| 2004/0026840 | A1* | 2/2004 | Eckel | F16D 3/52 |
| | | | | 267/154 |
| 2017/0343073 | A1 | 11/2017 | Muranaka | |
| 2017/0368401 | A1* | 12/2017 | Francis | A63B 21/045 |
| 2018/0231097 | A1 | 8/2018 | Fenioux et al. | |
| 2018/0283488 | A1 | 10/2018 | Durham et al. | |
| 2022/0056979 | A1* | 2/2022 | Oomen | F16F 13/04 |
| 2025/0243921 | A1* | 7/2025 | Tyler | F16F 13/04 |

* cited by examiner

Creep Test at +85C 100 hrs (Stress vs Time)

Silmix Wacker DRA-92121-1 85C 6x aft 100hr Heat Age Sample 2

Tensile Stress [MPa]

Tensile Strain (Displacement) [%]

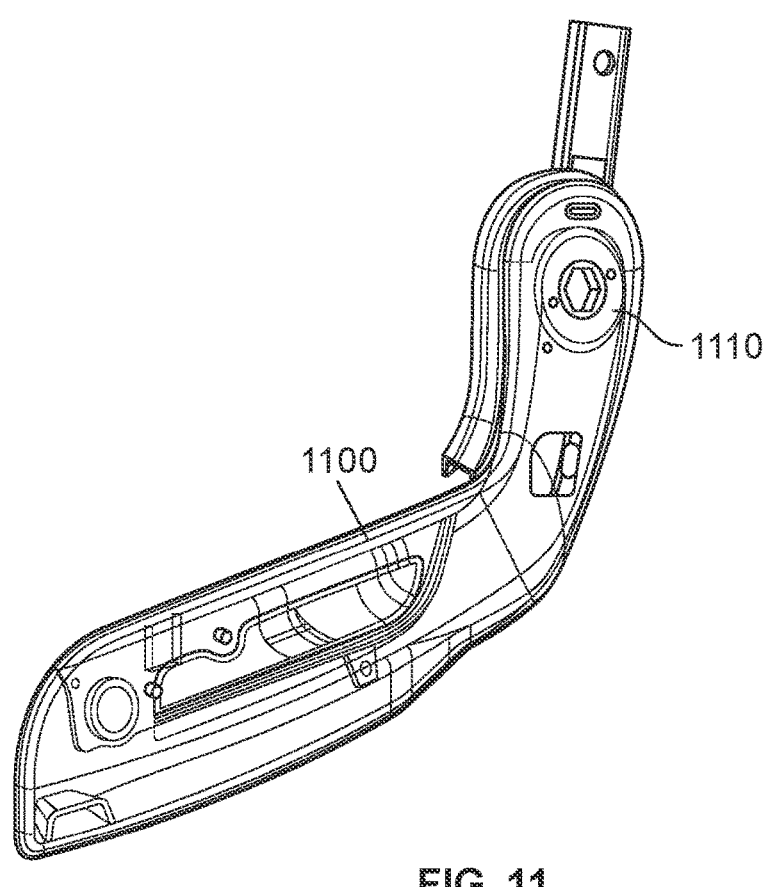
1110
1100
FIG. 11
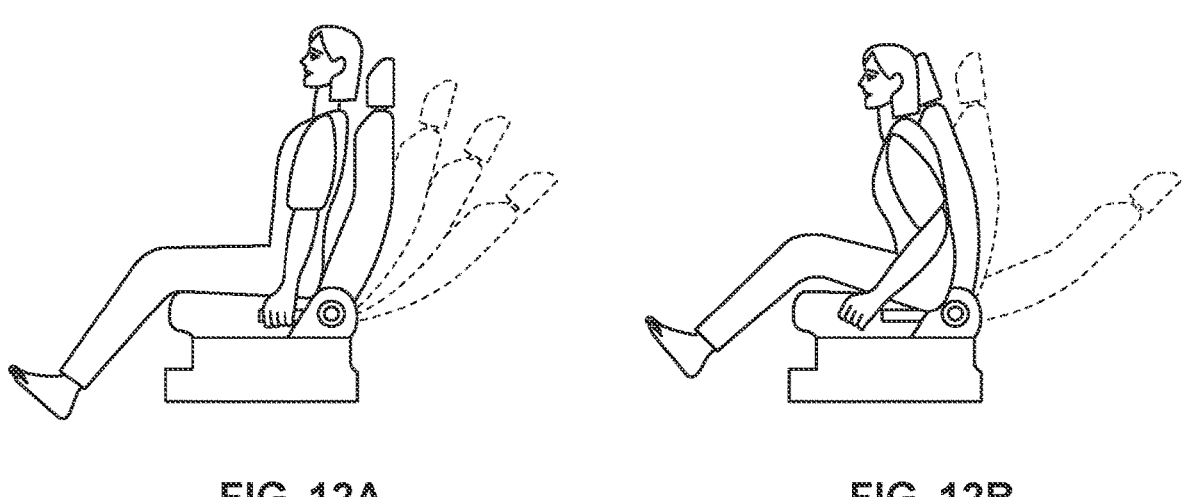
FIG. 12A              FIG. 12B

HIGH TEMPERATURE, HIGH TORQUE, POLYMERIC ROTATIONAL DAMPENER

CROSS-REFERENCE TO RELATED APPLICATIONS

This application claims priority to U.S. Provisional Patent Application No. 63/311,306 filed Feb. 17, 2022, and to U.S. Provisional Patent Application No. 63/313,510 filed Feb. 24, 2022, the entirety of which are incorporated herein by reference.

FIELD OF THE DISCLOSURE

Embodiments of the present disclosure provides a rotational spring dampener that has a compression limiter, a first disk, and a second disk. The first disk is disposed at a first end of the compression limiter and the second disk is disposed at a second end of the compression limiter, where the second end is opposite the first end. The rotational spring dampener also has a tensile member. The tensile member is connected to the first disk and the second disk. The tensile member is composed of a solid silicon polymer.

BACKGROUND

Various components, such as conduits and tubes, may be secured to surfaces, such as walls, ceilings, or the like, through routing clip assemblies. For example, a cylindrical tube may be secured to a wall through a routing clip assembly having a tube-retaining channel that snapably, latchably, or otherwise secures a portion of the tube. The routing clip itself is then secured within an aperture in the object by way of an anchoring member, such as, for example, a pine-tree fastener or a threaded bolt, which may be formed integrally with the routing clip. Optionally, the routing clip may not include an integral anchoring member and another component that may be used to anchor the routing clip assembly to a vehicle component.

Rotational springs may be used in a variety of applications. For some applications, it is desirable to combine a rotational spring with a dampener. Dampeners may reduce the release velocity of a loaded rotational spring after it is released. Some dampeners may be particularly useful in combination with specific types of rotational springs. For example, typical silicone dampeners offer only low amounts of resistance torque and may only be suitable for use with low torque rotational springs, and not for use with high torque springs. Further, certain dampeners may not be well-suited for use in all situations, for example, in extreme temperatures.

SUMMARY OF THE INVENTION

The present disclosure provides a rotational spring dampener that has a compression limiter, a first disk, and a second disk. The first disk is disposed at a first end of the compression limiter and the second disk is disposed at a second end of the compression limiter, where the second end is opposite the first end. The rotational spring dampener also has a tensile member. The tensile member is connected to the first disk and the second disk. The tensile member is composed of a solid silicon polymer.

In some embodiments, a rotational spring dampener comprises a core, a first solid component, a second solid component, and a tensile member. The core comprises an opening therethrough. The first solid component comprises a first set of bosses and the second solid component comprises a second set of bosses. The tensile member is positioned between the first solid component and the second solid component and comprises a solid silicon polymer.

In some embodiments, a rotational spring dampener assembly comprises a cap, a base plate, and a dampener. The cap includes a cap opening and the base plate includes a base plate opening. The dampener is placed between the cap and the base plate, and the dampener comprises a first disk, a second disk, a tensile member, and a hole. The first disk and the second disk are disposed at the first end and a second end of a compression limiter respectively. The tensile member extends between the first disk and the second disk, and the tensile member wraps around the compression limiter about a longitudinal axis. The cap opening, the hole of the dampener, and the base plate opening are concentric about a longitudinal axis.

In another embodiment, a rotational spring dampener assembly comprises a first solid component, a second solid component, a tensile member, and at least one longitudinal cap. The first solid component includes a plurality of solid modular subcomponents, the solid modular components including a plurality of first bosses and a central aperture. The second solid component includes a body and a plurality of second bosses extending outwardly from an outer surface of the body. The tensile member includes a plurality of voids disposed between a plurality of bands. The at least one longitudinal cap is disposed at an end of the tensile member. The plurality of second bosses is received by the plurality of voids of the tensile member to create a first subassembly and the first subassembly is inserted through a central aperture of the first solid component.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

FIG. 11 is a right perspective view of an automotive seat side shield in which one embodiment of a dampener is deployed;

FIG. 12A is an illustration of a rotational spring-driven motion of an automotive seat with a rotational spring dampener;

FIG. 12B is an illustration of a rotational spring-driven motion of an automotive seat without a rotational spring dampener;

Figure 1A:
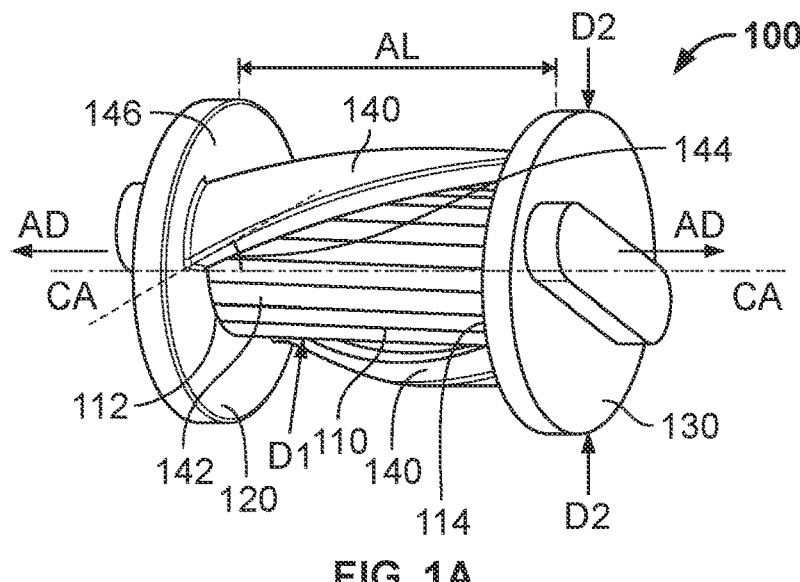
FIG. 1A is a top, front, and right perspective view of a basic embodiment of a dampener in a pre-loaded home position.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. It is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

The present disclosure provides a dampener that may be combined with a rotational spring to improve the performance of the spring. The term rotational spring is interchangeable with the term "torsion spring," as used herein. Torsion springs are often coupled with a dampener such that the spring may drive a mechanical motion in a clockwise or counterclockwise direction while being dampened to control the spring's rotational velocity and/or resonant bounce. Such springs are often metallic coil springs or clock springs.

For some applications, low mass and low-level torque requirements may be adequately supplied by metal springs. However, when metal springs are used in applications with high torque requirements, specifications often necessitate the use of heavy gage wire to obtain the desired torque. This increases product mass and size/volume, which is often undesired. For example, in some applications, the packaging for the torsion spring and the dampener must be small to fit within a provided storage space and provide aesthetic satisfaction, while performing consistently over time, withstand temperature changes, and perform quietly. Additionally, for some applications, certain materials may not be suitable for use in a dampener. For example, in high-heat applications (such as temperatures above 140° F.), certain polymeric materials may become overly oriented (e.g., melt or exhibit an increase in pliability), which may lead to undesirable deformation (e.g., annealing or buckling) of the polymeric material. Embodiments of the present disclosure discussed herein address some of these deficiencies.

Some existing dampener devices known for use with hinge rotation of heavy vehicle components (e.g. vehicle doors, seats, tailgates, boot, and hatch back closures) may include: (1) linearly moving gas filled struts; (2) silicone gel viscosity dampers; (3) steel clock/coil springs; (4) friction dampeners, such as those using surface to surface friction to generate kinetic energy absorption (e.g. a Reell friction damper); and (5) steel torsion bar dampeners, which are frequently configured as a viscous dampener having a steel bar that twists within a viscous material. However, these existing dampener devices have several problems and limitations.

For example, current gas strut solutions are typically crafted and designed using a metal tube cylinder and a piston that house high pressure gas. The motion control of the piston is limited to linear motion (e.g., straight-line) and/or non-rotary/pivoting motion. The gas structure may also include a linear strut that typically assists a separate simple hinge, such as, but not limited to a 4-bar link hinge and the like. Additionally, the design packaging required for gas struts and the strut solutions are typically larger than what can be accommodated in many applications (e.g., such as in a vehicle seat). Also, the seals used in piston and cylinder designs tend to leak over time, which results in a loss of gas pressure. The loss of pressure may cause gas strut solutions to fail or significantly reduce the performance of the gas struct over a short period of time. Moreover, gas struts tend to have a high cost due to their design and manufacturing complexity.

Silicone gel or viscosity dampers rely on the relatively high viscosity of the liquid or gel silicone to provide fluidic friction (e.g., resistance) for dampening. Dampening in rotary motion is typically limited to less than 1 Nm when silicone fluid housings are produced with thermoplastic construction, as is commonly known in the industry. When torque values above 1 Nm are needed, the use of metallic housing is typically required to contain the resulting pressure. Silicone gel or viscosity dampers further require fluidic seals positioned such that the gel does not leak over time and during cycling. Problematically, metallic housings are typically formed from diecast aluminum or zinc, which significantly increases the mass of the solution, rendering them unsuitable for many applications. Moreover, high-torque applications (such as vehicle seats, hatchbacks, and doors) may require the use of multiple silicone gel or viscosity dampers to provide the necessary dampening effect to all positions. Therefore, the problematic addition of mass associated with silicone gel or viscosity dampers would be multiplied if used in these applications, making such dampeners particularly unsuitable. Additionally, the silicone gel used in current rotary dampers is highly temperature dependent. In particular, the resistance torque of the silicone gel is measured at extreme temperatures, which effects the performance of the silicone gel dampeners at these temperatures. For example, at cold temperatures (such as below −40° F.), the viscosity of the silicone gel increases significantly and at hot temperatures (such as above 185° F.), the viscosity of the silicone gel is greatly reduced.

As another example of the shortcomings of known dampening devices, steel springs are sometimes used to counteract a motion inducing spring force or gravitational force acting on a heavy closure or seat back. The counter spring may be tuned to engage the moving application part way through the motion of the application, applying a negative force on the application that slows its velocity or rotational inertia (e.g., moment of inertia). While this is a popular solution, it has significant drawbacks. Such dampening springs do not perform well with fatigue cycling over time. Relatedly, the hardening of the steel springs hardens the steel material over time increasing the brittleness of the steel material, which may cause the steel spring to fail. As with other unsuitable dampeners, the use of metallic components typically results in packaging that is larger than what can be accommodated in many applications (such as in a vehicle seat), and in a device that is heavier than what can be accommodated in many applications. Additionally, steel springs are necessarily metallic, which can be noisy and generate buzz, squeak, and rattle (BSR) issues when used in vehicle interiors.

As still another example of the shortcomings of known dampening devices, friction dampeners typically use forces that are applied perpendicular to opposing surfaces, such that the friction is generated when the dampener is moved rotationally or linearly. The applied forces are typically induced by a coil metallic spring. Stress and wear on internal parts can be a major issue in these dampeners depending on the materials used to form the friction surfaces. This is especially true when less dense materials (e.g., viscoelastic and/or compressible rubber type materials) are used to for the friction surfaces. Alternatively, if more dense materials are used, the added weight may result in a dampening device that is heavier than what can be accommodated in many applications. Additionally, it is difficult to configure friction dampers to have a "free run-style dampening" (as described below), and any such configuration is likely to result in excessive size, complexity, and cost. The friction dampeners typically provide little to no torque in at least one direction (typically the counterclockwise direction) and may provide insufficient torque (such as 0.2 Nm of torque dampening) in the other direction (typically the clockwise direction). Further, friction dampers offer little to no spring dampening or torque assistance. Moreover, the engaging components of friction dampeners tend to lose torque over time when exposed to multiple heating/cooling cycles making the dampeners complete unusable in applications exposed to significant temperature swings. This wearing also shortens the life for these dampeners, often to unacceptable levels. Another issue with friction dampeners is that the resins used in friction dampening tend to anneal and creep over time and, as a result, the initial resistive friction forces of the dampeners are lost. Friction dampers are also known to generate noise, especially squeaking, when used and are therefore undesirable for use in vehicle interiors.

The dampeners of the present disclosure discussed herein address some of these deficiencies. The dampeners mitigate the deficiencies by (1) providing a rotational dampening device that consists exclusively of polymeric materials (i.e., does not contain any metallic components); (2) providing a rotational dampening device capable of leveraging the viscoelasticity/friction of the polymer material from which it is formed; (3) providing a rotational dampening device that is capable of repeatedly withstanding torsion loading at 100% of rotation for at least 1000 hours at extreme temperatures (e.g., below −40° F. and above 185° F.); (4) providing a rotational dampening device with a low mass that is of sufficient for use in vehicle seats; (5) providing a rotational dampening device with a 3D spatial volume and packing size that is sufficiently small for use in vehicle seats; (6) providing a rotational dampening device that is sufficiently silent during operation for use in a vehicle interior; (7) providing a rotational dampening device that is sufficiently self-contained for shipping and trim level assembly; (8) providing a rotational dampening device that is highly scalable, such that is may be suitable for use in particularly high-torque applications (e.g., in vehicle seats, vehicle hatch-backs, and/or vehicle doors); (9) providing a rotational dampening device that is capable of turning and dampening the movement of an application in both a clockwise direction and counterclockwise direction; (10) providing a rotational dampening device that can be easily configured to include a "free run" or "loss motion" feature; (11) providing a rotational dampening device that is capable of repeatedly returning to its home position (or "zero point position") following operation; and (12) providing a rotational dampening device that can be easily configured to function as a "lift assist" device.

Figure 1B:
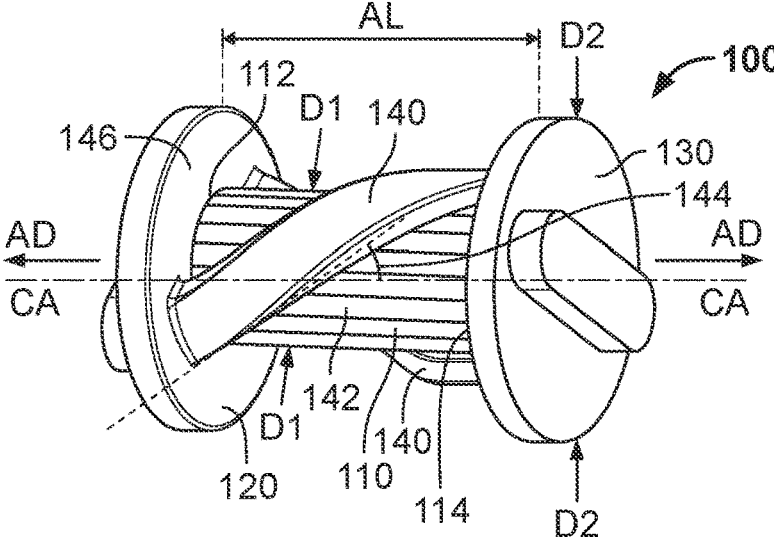
FIG. 1B is a top, front, and right perspective view of the dampener of FIG. 1A in a 30-degree rotation applied position.
Figure 1C:
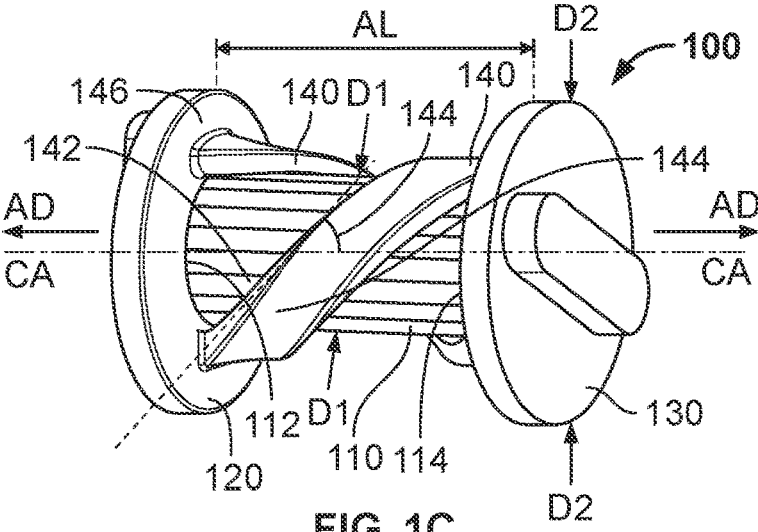
FIG. 1C is a top, front, and right perspective view of the dampener of FIG. 1A in a 240-degree rotation applied position.
Figure 2A:
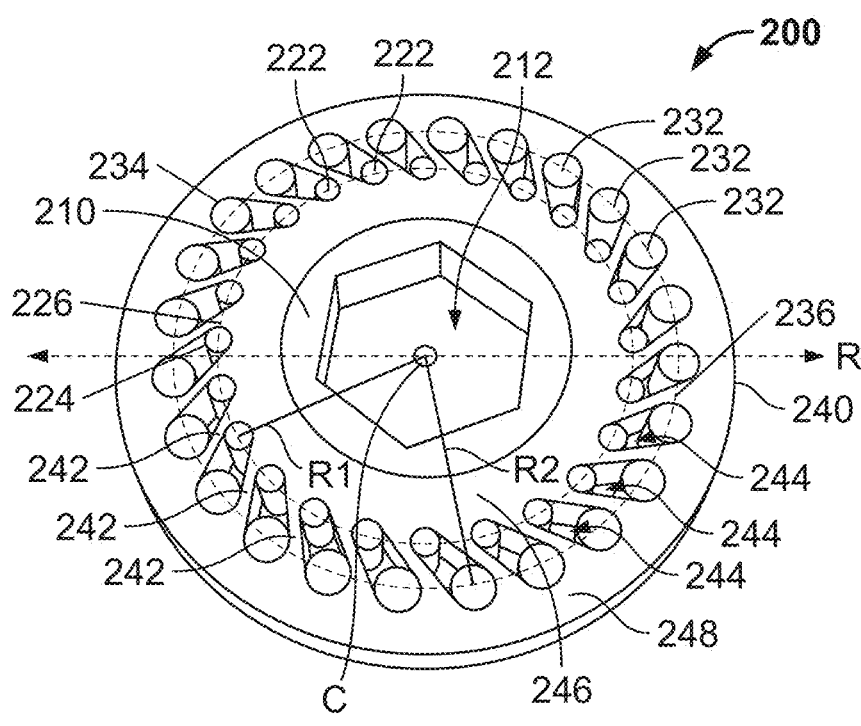
FIG. 2A is a cross-sectional view of a preferred embodiment of a dampener in a pre-loaded rest/home position.
Figure 2B:
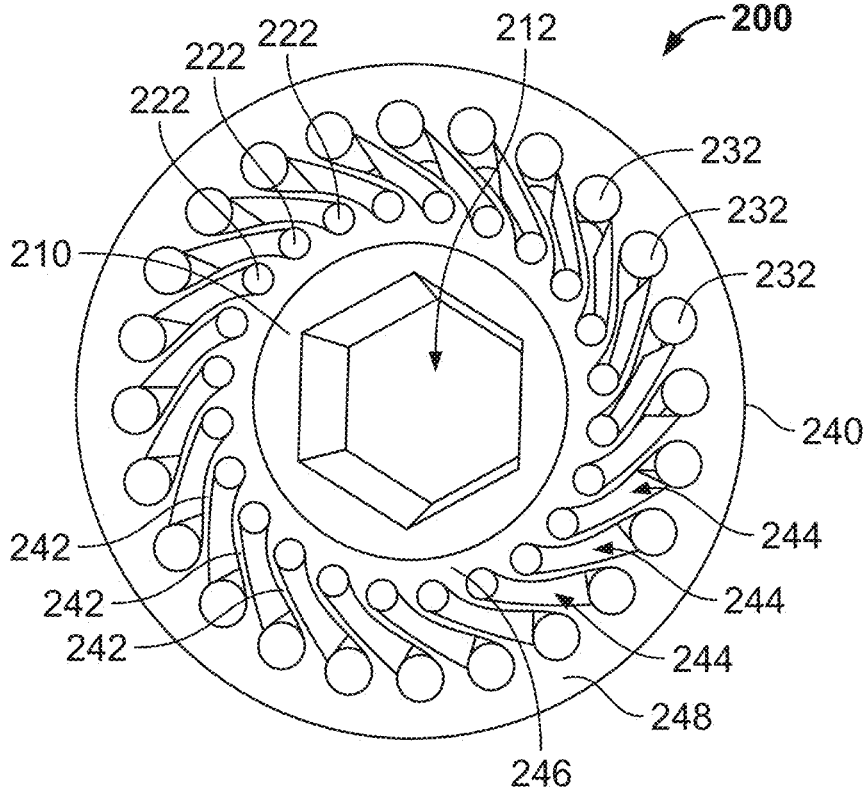
FIG. 2B is a front cross-sectional view of the preferred embodiment of a dampener of FIG. 2A in a position after a slight rotation has been applied.
Figure 2C:
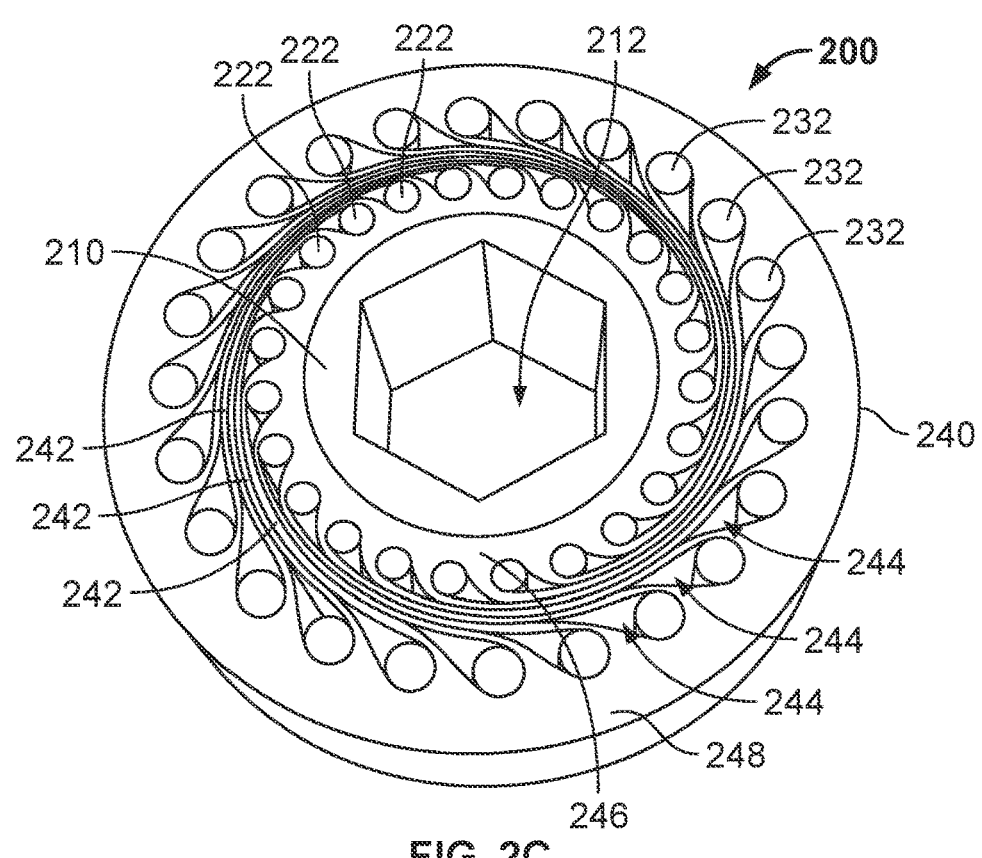
FIG. 2C is a front cross-sectional view of the preferred embodiment of a dampener of FIG. 2A in a position after a larger rotation has been applied.

FIGS. 1A-1C show a basic embodiment of a dampener that illustrates underlying concepts used herein. FIGS. 2A-2C show a preferred embodiment dampener. FIGS.

10A-10F show another preferred embodiment dampener. Other preferred embodiment dampeners may also be possible.

FIGS. 1A-1C illustrates a basic embodiment of a dampener 100 and the underlying concepts of the dampener used herein. The dampener 100 includes a solid core 110 which may also be referred to as a compression limiter 110. The dampener 100 also includes a first disk 120 that is disposed at a first end 112 of the compression limiter 110 and a second disk 130 that is disposed at a second end 114 of the compression limiter 110. The second end 114 is opposite of the first end 112, with reference to an axial length AL of the compression limiter 110. The dampener 100 also has a tensile member 140.

Continuing, the compression limiter 110 is positioned between the first disk 120 and the second disk 130, such that the first disk 120 and second disk 130 are prevented from contacting each other by the compression limiter 110. The compression limiter 110 may be cylindrical in shape, as shown in FIGS. 1A-1C. However, the compression limiter 110 may alternatively be formed in other shapes, such as a rectangular prism, hexagonal prism, octagonal prism, or the like. The compression limiter 110 may be elongated, such that the axial length AL in an axial direction AD is greater than a diameter D1 of the compression limiter 110. However, the compression limiter 110 may alternatively have a wide shape, such that the diameter D is larger than the axial length AL in the axial direction AD. In one embodiment, the compression limiter 110 may be a barrel. The compression limiter 110 may be composed of any suitable material for separating the first disk 120 and the second disk 130. In a particular embodiment, the compression limiter 110 is made out of a hard polymeric material, such as polyvinylchloride (PVC), high-density polyethylene (HDPE), fluoroplastics (such as Teflon), polyamides (such as Nylons, especially Nylon 6, Nylon 66, Nylon 12, Nylon 13, and Nylon 11), polyethylene terephthalate (PET), polybutylene terephthalate (PBT), or polyoxymethylene (POM). The compression limiter 110 being composed of such materials may be advantageous as it will have a relatively low mass, be inexpensive to fabricate, and may also provide advantages in terms of the amount of friction generated between the compression limiter 110 and the tensile member 140.

The first disk 120 and second disk 130 may be formed in any shape suitable for the application in which they are deployed. For example, as illustrated in FIG. 1A, the first disk 120 and the second disk 130 are both circular in shape. In some embodiments, the disks 120, 130 may be rectangular, hexagonal, octagonal, or the like. The disks 120, 130 may be formed in any size suitable for the application. In some embodiments, the first disk 120 and the second disk 130 may have a diameter D2 that is larger than the diameter D1 of the compression limiter 110. In alternative embodiments, the diameter D2 of the disks 120, 130 may be same size as or is smaller than the diameter D1 of the compression limiter 110. The disks 120, 130 may be made of a hard, polymeric material, such as polyvinylchloride (PVC), high-density polyethylene (HDPE), fluoroplastics (such as Teflon), polyamides (such as Nylons, especially Nylon 6, Nylon 66, Nylon 12, Nylon 13, and Nylon 11), polyethylene terephthalate (PET), polybutylene terephthalate (PBT), polyoxymethylene (POM), or other suitable materials. Further, it is also contemplated that the first disk 120 may be composed of a different material than the second disk 130. Still further, it is envisioned that the disks 120, 130 may be composed of the same material as the compression limiter 110. In some embodiments, it may be advantageous for the disks 120, 130 to be composed of the same material as the tensile member 140. In such embodiments, the tensile member 140 and the disks 120, 130 may be formed integrally as a unitary component.

Still referring to FIG. 1A, the tensile member 140 is connected to the first disk 120 and the second disk 130 about a central axis CA. The tensile member 140 may be a band or a plurality of bands. For example, the tensile member 140 may be configured to have three bands, five bands, ten bands, or more. In some embodiments, the plurality of bands of the tensile member 140 may be spaced equally about the central axis CA. In some embodiments, the tensile member 140 may be a strap. In some embodiments, the tensile member 140 is twisted about the central axis CA, so that the tensile member 140 is elastically deformed and exerts a compressive force on the first disk 120 and the second disk 130 such that the disks 120, 130 engage the compression limiter 110 at the first end 112 and the second end 114, respectively. In addition to the dampening effects provided via elastic deformation and compression of the tensile member 140, friction or resistance may be generated between the tensile member 140 and an outer axial surface 142 of the compression limiter 110 and/or the disks 120, 130.

The materials suitable for the tensile member 140 must be capable of repeatedly withstanding torsion loading (from 100% up to 600%) of rotation for at least 1000 hours at extreme temperatures (e.g., below −40° F. and above 185° F.). Additionally, suitable materials must satisfy certain material property constraints for a lightweight, compact rotational dampener. Non-limiting examples of materials suitable for use in the tensile member 140 include thermoset silicon elastomers, thermoset fluorine containing elastomers, and hybrids thereof. In some embodiments, the tensile member 140 may be composed of a solid silicone polymer.

The term "solid silicone polymer" as used herein, may refer to polymers composed primarily of silicone-containing monomeric units, such as siloxane. As such, solid silicone polymer may also be referred to as solid polysiloxane. In some embodiments, solid silicone polymers may be formed exclusively of silicone-containing monomeric units. In some embodiments, solid silicone polymers may be copolymers formed from one or more silicone-containing monomer units and one or more other co-monomeric units (i.e. a solid silicone copolymer). In some embodiments, solid silicone polymer may be internally crosslinked. In some embodiments, solid silicone polymers may be thermoset polymers. Solid silicone polymers, as used herein, experience elastic deformation rather than viscous flow. Specifically, tensile members 140 formed using the solid silicone polymers may have degree of polymerization of at least 100, or of at least 200, or of at least 500, or of at least 1000. In some embodiments, a solid silicone polymer that has been polymerization-grafted with fluorine-containing functional groups and/or co-polymerized with fluorine-containing comonomers may be especially well-suited for use in certain dampeners.

The tensile member 140 may be composed of a solid silicon polymer, the solid silicon polymer that has grafted with fluorine-containing functional groups, blends, or other combination thereof. In some embodiments, the solid silicon polymer may be a high consistency silicone polymer, such as high consistency rubber ("HCR") which is typically a thick gel. As HCR silicone is in the gel form, it is important that the molecular weight of the silicon polymer is high. For example, HCR silicone polymer, even before crosslinking, has a very high molecular weight compared to a 2-part "hand mixed" silicone resins or liquid silicone resins. Heat-cured rubber via high temperature vulcanizing (HTV) or HCR contains polymers with a high molecular weight and long polymer chains. HCR silicone possesses a number of important material properties, such as high viscosity, resiliency, recovery after elongation or compression, resistance to extreme temperature conditions, electrical properties, and consistent viscosity similar to a putty.

Solid silicone polymer may be combined with certain additives to modify its physical properties. The solid silicone polymer can be combined with any additive that may be suitable for a particular application. For example, the solid silicone polymer can be combined with certain additives to increase/decrease its elasticity, tensile strength, heat resistance, creep resistance, lubricity, and/or other target property. Nonlimiting examples of additives suitable for certain applications include flouro-elastomer such as PTFE or Teflon, and siloxane oil. In some embodiments, the tensile member 140 may be composed of a resin including the solid silicone polymer and one or more additives. In some embodiments, the additives may be added to the solid silicone polymer after the polymer has been polymerized and cooled as a coating. The resin may be configured as a melt blend of the solid silicone polymer and said additive(s).

Without wishing to be limited by any particular theory, it is believed that the very high molecular weight of cross-linked HCR silicone polymer may resist at least 1000 hours of continuous torsional strain (from 400 to 1200% torsional strain) with the resin being continuously exposed to 85° C. for the entire duration of the 1000 hours of continuous strain, without experiencing unacceptable levels of creep or annealing. This property is important for dampeners to function acceptably considering the rigors present in the automotive interiors.

The solid silicone polymer used in the tensile member 140 may have a yield strength from about 1 MPa to about 15 MPa, or from about 2 MPa to about 12 MPa, or from about 5 MPa to about 9 MPa, or about 7 MPa, as measured according to ASTM D638. The solid silicone polymer used in the tensile member 140 may have a percent-elongation-to-break from about 100% to about 2000%, or from about 200% to about 1800%, or from about 300% to about 1500%, or from about 400% to about 1200%, as measured according to ASTM D638. The solid silicone polymer used in the tensile member 140 may have an percent-elongation-to-break of at least 200% when measure at −40° C., or of at least 300% when measure at −40° C., or of at least 400% when measure at −40° C. The solid silicone polymer used in the tensile member 140 may also exhibit good creep resistance when at 85° C. under continuous and/or repeated load. A solid silicone polymer exhibiting good creep resistance may display less than 30% performance loss after 200 hours of 140° F. exposure while under 100% peak loading.

The tensile member 140 composed of the solid silicone polymer may have numerous advantages over tensile members 140 composed of other materials, especially metallic materials. The solid silicone polymer provides high amounts of torsional resistance while maintaining a low mass, and the ability to generate large amounts of friction between itself and other components of the dampener 100 (such as the compression limiter and/or disks). Additionally, a tensile member 140 composed of the solid silicone polymer may be suitable for use in high-heat situations (i.e., at temperatures more than 140° F.). Without wishing to be limited by any particular theory, the chemical structure of HCR silicone polymer may allow the solid silicone polymer to avoid becoming overly-oriented in high-heat situations, and thus may allow solid silicone polymers to avoid undesirable annealing under such high-heat conditions. Additionally, a tensile member 140 made of solid silicone polymer may be less costly to produce and manufacture. These advantages may allow the dampener 100 with a tensile member 140 composed of the solid silicone polymer to be smaller, lighter, have improved versatility, be less conspicuous, and less expensive, while also being capable of providing greater torque resistance, which may make the dampener 100 particularly suitable for certain applications.

The tensile member 140 may be connected to the first disk 120 and second disk 130 in any suitable manner. For example, the tensile member 140 may be mechanically fastened or adhered to the disks 120, 130. In some embodiments, the tensile member 140 and the disks 120, 130 may be formed integrally as a unitary piece composed of a single material. For example, the tensile member 140 and the disks 120, 130 may be simultaneously overmolded onto the compression limiter 110 via a 1-Shot Injection Molding or a 1-Shot Injection Molding process. Specifically, the solid silicone polymer may be polymerized within the mold itself. Alternatively, the solid silicone polymer may be polymerized in a barrel of an extruder and extruded onto a mold.

Still referring to FIGS. 1A-1C, the dampener 100 may be twisted about the central axis CA. In some embodiments, the force that causes the dampener 100 to twist about the central axis CA may be generated by a separate torsion spring, with which the dampener 100 has been combined. When the dampener 100 is twisted, the tensile member 140 is loaded and elongates, wrapping around the compression limiter 110, as shown in FIGS. 1B and 1C. As the tensile member 140 wraps around the compression limiter 110, the tensile member 140 defines an angle 144 relative to an inner plane 146 defined by the first disk 120. The tensile member 140 may be configured and positioned such that the angle 144 defined by the tensile member 140 and the first disk 120 has any value less than 90°. For example, the angle 144 defined by the tensile member 140 and the first disk 120 may have a value from greater than 0° to less than 90°, or from 10° to 80°, or from 20° to 70°, or from 30° to 60. In an embodiment, the angle 144 defined by the tensile member 140 and the first disk 120 may have a value of about 45°. Additionally, as the tensile member 140 continues to wrap around the compression limiter 110 the angle 144 defined by the tensile member 140 and the first disk 120 may continually change. Specifically, the angle 144 defined by the tensile member 140 and the first disk 120 may continually be reduced (towards an angle approaching 0°) as the tensile member 140 continues to wrap around the compression limiter 110. When the dampener 100 is twisted, the tensile members 140 also exert a compressive force on the first disk 120 and the second disk 130, pulling the disks 120, 130 toward each other and moving the first disk 120 toward the first end 112 of the compression limiter 110 and the second disk 130 toward the second end 114 of the compression limiter 110. In some embodiments, the elongation (and eventual relaxation) of the tensile member 140 may dissipate energy and reduce rotational velocity. In some embodiments, the compressive force may generate friction, which can dissipate energy and reduce rotational velocity.

In some embodiments, portions of the compression limiter 110, the first disk 120, the second disk 130, and the tensile members 140 contact each other and generate friction. The friction between the compression limiter 110 and the tensile members 140 act to slow the rotary motion provided by the dampener 100, as well as any torsion spring (not shown) with which it is combined. Additional friction can be added to further control the rotational velocity of the torsion spring return. This friction/interference can be controlled, in part, by the design and composition of the tensile member 140, the disks 120, 130, and the compression limiter 110. The tensile members 140 offer tensile resistance that is translated into a rotary motion resistance. In many applications (e.g., torsion spring deployed in an automotive seat or closure door), a rotational dampening function is needed to remedy a slapping or sudden high-speed movement of the torsion spring. Alternatively, the tensile members 140 may be configured to offer a torsion moment and thereby act as a torsion spring, which may also be referred herein as a lift assist feature or a lift assist device.

Friction that dampens rotational speed can be supplied in several directions and locations. One is in the axial direction, between the tensile member 140 and the axial faces of the compression limiter 110 and/or other solid components. A second is between the tensile member 140 and the radial surface of the compression limiter 110 or a core (not shown). Another is between portions of the tensile member 140, especially the plurality of bands that may contact one another as the tensile member 140 is deformed. There are numerous factors that can control or vary the amount of friction that dampens the rotational speed of the dampener 100 and any rotational spring with which it may be combined.

Characteristics such as the size, shape, design and spacing of the components of a dampener 100 can affect the amount of dampening effect generated. For example, the diameter D2 of the disks 120, 130 relative to the diameter D1 of the compression limiter 110 and presence or absence of features that increase the surface area of the disks 120, 130 or axial faces of the compression limiter 110 (such as undulations, grooves, or corrugations) also affect the amount of dampening effect generated. Similarly, a cross-sectional area of the tensile member 140 affect the amount of dampening effect generated as larger tensile member 140 width will increase the contact area between the tensile member 140 and the compression limiter 110, thus increasing dampening effect. Additionally, the polish or surface condition of the molded cavity used to form the compression limiter 110 or tensile member 140, and thus the smoothness of these components, affects the amount of dampening effect generated. The material/resin selected for the compression limiter 110 also affects dampening effect. Moreover, the axial length AL of the compression limiter 110 can affect dampening effect. For example, a longer compression limiter 110 may generate more dampening effect. The radial spacing of tensile members 140, which can loosen or increase interference with the compression limiter 110, also affects the dampening effect.

Additionally, the composition and properties of the solid silicone polymer and any resin in which it is included also affects the amount of dampening effect generated. For example, the durometer of the solid silicone polymer used in the tensile member 140 may affect the amount of dampening effect generated. The solid silicone polymers having a certain desirable Shore A hardness will provide ideal tackiness. For example, the tackier the polymer, the more dampening effect that will be generated. Further, the final composition of the resin comprising the solid silicone polymer, including the presence or absence of friction-altering additives like siloxane, polytetrafluoroethylene, flourocarbons that are derivatives of Teflon™, and/or other fluorine-based resins, may affect the amount of friction and dampening effect generated. Relatedly, the Friction Factor of the solid silicone polymer resin of the tensile member 140 and the material used in the compression limiter 110 affects the amount of friction generated, which affects the device torque output. Also, the percentage of orientation of the resin used in the tensile members 140 effects the modulus of elasticity of the tensile members 140 and the amount of dampening effect generated. Notably, the dampening effect of the solid silicone polymer resin refers to the elongation stress and un-stressing of the tensile members 140 composed of the solid silicone polymer and the rate of return to home position of the tensile members 140, which can be controlled by including additives that decrease the durometer of the polymer and thereby affect the dampening provided by the dampener 100. In some embodiments, it may be advantageous to configure the silicone polymer of the tensile member 140 to have a durometer, measure in Shore A hardness, from 10 to 90, or from 20 to 80, or from 30 to 70, or from 40 to 60, or from 40 to 50. As used herein, the term "low modulus silicone polymer" may refer to a solid silicone polymer having a Shore A hardness from about 30 to about 45, and the term "medium modulus silicone polymer" may refer to a solid silicone polymer having a Shore A hardness from about 46 to about 60, and the term "high modulus silicone polymer" may refer to a solid silicone polymer having a Shore A hardness from about 61 to about 75. The orientation of the stress-strain curve for the solid silicone polymer resin is also important, in that a curved-shape stress-strain curve facilitates energy dissipation.

The amount of linear spring load in the axial direction AD on the compression limiter 110, the number of preloaded rotational turns on the dampener 100 relative to a home position (see FIG. 2A), the torque in relation to rotational turns on the dampener 100 relative to the home position, and the return speed of the stressed polymer resin also affect the amount of dampening generated.

The solid silicone polymer can be modified to adjust its elongation or yield point. Nonlimiting examples of modifications include varying the method used to cure the solid silicone polymer (e.g., varying the method used to induce crosslinking in the solid silicone polymer). The solid silicone polymer may be cured and/or crosslinked using peroxide (such as varox peroxide), or catalyzing crosslinking with a catalyst such as platinum. The elongation strength of the solid silicone polymer can also be controlled by varying the molecular weight of the solid silicone polymer prior to curing/crosslinking (and then curing said solid silicone polymer). The solid silicone polymer with a high molecular weight (and therefore a low viscosity) before curing/crosslinking may have a lower modulus after crosslinking, as opposed to a solid silicone polymer with a low molecular weight (and therefore a high viscosity) before curing which may have a high modulus after crosslinking.

Modifications to the solid silicone polymer that reduce elongation tend to increase yield point, which in turn tends to increase the rotational stiffness of the dampener 100. Modifications that reduce the friction factor between the tensile member 140 and the compression limiter 110 (or between moving parts of the tensile member itself) and may improve the wear characteristics of the dampener 100. Further, a harder polymeric resin will reduce the friction between the compression limiter 110 and tensile member 140 (e.g., plurality of bands), reducing the dampening effect which increases the velocity.

The plastic deformation of the solid silicone polymer can act as dampening media via energy loss. Motion can be dampened through loss of energy from loading and unloading the tensile member 140 composed of solid silicone polymer. In some embodiments, the plastic deformation of the tensile member 140 may be the primary dampening force provided by the dampener 100, which may contribute a greater dampening effect than any friction that may be generated by the dampener 100. In some embodiments, friction may be minimized such that plastic deformation of the tensile member 140 is substantially the only dampening effect provided by the dampener 100. The dampeners 100 may minimize internal friction through coating the tensile member 140 with a lubricant (e.g., grease or oil). Additionally or alternatively, other solid components of the dampener 100 may be coated with a lubricant to minimize friction.

Advantageously, the dampeners with tensile members 140 composed of solid silicone polymer can be used in combination with tension springs having a wide range of torque. Typical liquid silicon dampeners may offer only up to 70 Ncm of resistance torque, and high torque dampeners may offer up to 2000 Ncm of resistance. However, dampeners 100 of the present disclosure include tensile members 140 composed of solid silicone polymer, which can offer high torque resistance values between 2000 Ncm and 10000 Ncm. Importantly, dampeners 100 of the present disclosure offer this high torque resistance while also maintaining a low weight and/or mass and small volume because of the use of solid silicone polymer and exclusion of heavy metallic components. For example, the dampener 100 of the present disclosure may advantageously be devoid of metal. Additionally, the dampener 100 of the present disclosure may advantageously be devoid of fluid, such as silicone fluid. Typically, metallic and liquid silicone components increase the weight/mass and volume of dampeners 100. The aforementioned dampeners 100 with high torque resistance in combination with low mass and low volume are uniquely well suited for a number of applications, including use in automotive seats, doors, and tailgates.

A challenge associated with the use of silicone polymers in certain mechanical applications relates to the lubricity of silicone polymers. Specifically, silicone polymers are so slippery that conventional methods commonly used to attached elastomeric parts to structural components (e.g., a dovetail, a snap feature, a barb, or an arrowhead, as used in traditional plastic design) may not be suitable for use with some silicone polymers. As a result, alternative structures are needed to incorporate some solid silicone polymers into certain applications. Referring to FIG. 2A, a preferred embodiment dampener 200 disclosed herein addresses these problems.

FIGS. 2A-2C show one preferred embodiment dampener 200, capable of incorporating at least one tensile member formed from an HCR silicone polymer resin. The dampener 200 has a core or barrel 210 with a central opening 212 disposed therethrough. The dampener 200 also has a first set of bosses 222 (with each boss therein being a first boss 222) that may be part of a first solid component (not shown in FIG. 2, but shown as 220 in FIGS. 8A-8D) and a second set of bosses 232 (with each boss therein being a second boss 232) that may be part of a second solid component (not shown in FIG. 2, but shown as 230 in FIGS. 8A-8D). As shown in FIGS. 2A-2C, the first set of bosses 222 is configured as a smaller ring or a first diameter 226 surrounding the core 210 and the second set of bosses 232 is configured as a larger ring or a second diameter 236 surrounding the first set of bosses 222. For example, as illustrated in FIG. 2A, the first set of bosses 222 may be spaced at a first distance R1 from a center C of the central opening 212 and circularly surrounding the core 210. Additionally, the second set of bosses 232 may be spaced at a second distance R2 from a center C of the central opening 212 and circularly surrounding the core 210. The dampener 200 also has a tensile member 240. The tensile member 240 has bands 242 and internal voids 244, as well as an inner or interior portion 246 and an outer or exterior portion 248. The tensile member 240, the first set of bosses 222, and the second set of bosses 232 are configured and positioned such that at least one first boss 222 and at least one second boss 232 are positioned with at least one void 244 of the tensile member 240. In the embodiment shown in FIGS. 2A-2C, one first boss 222 and one second boss 232 are positioned within each void 244 of the tensile member 240. Bands 242 separate the voids 244 from one another along the lateral sides of each void 244. Bands 242 also extend between the inner portion 246 and the outer portion 248 of the tensile member 240. In some embodiments, the bands 242 extend tangentially between the first diameter 226 and the second diameter 236.

In the embodiment shown in FIGS. 2A-2C, the first bosses 222 are configured to have a substantially cylindrical shape and a top distal surface that is substantially flat. The first bosses 222 may have a first diameter 224 from about 2 mm to about 12 mm, or from about 3 mm to about 10 mm. In a particular embodiment, the first bosses 222 may have a diameter from about 3 mm to about 8 mm or of about 4 mm. In the embodiment shown in FIGS. 2A-2C, the second bosses 232 are also configured to have a substantially cylindrical shape and a top distal surface that is substantially flat. The second bosses 232 may have a second diameter 234 from about 2 mm to about 12 mm, or from about 3 mm to about 10 mm. In a particular embodiment, the second bosses 232 may have a diameter from about 3 mm to about 8 mm or of about 4 mm. In the embodiment shown in FIGS. 2A-2C, the first diameter 224 is different than the second diameter 234. However, in an alternative embodiment, the first diameter 224 may be the same as the second diameter 234. In another embodiment, the first diameter 224 may be larger than the second diameter 234.

As shown in FIGS. 2A-2C, the first bosses 222 are configured in an inner circular row around the core 210. Each of the first bosses 222 is linked to a shared part, referred to as the first solid component (not shown, but shown in FIG. 9A-9D as 220). The first solid component may be a plate that is disposed on a distal end of the first bosses 222. In embodiment, the first bosses 222 may form a single, integral, unitary piece with the first solid component. For example, the first solid component may be a larger component that includes the first bosses 222. In an embodiment, the first solid component (including the first bosses 222) may be molded from a polymeric material. The first solid component (including the first bosses 222) may be formed from any polymeric material suitable polymeric material. Non-limiting examples of suitable polymeric materials include: PET (polyethylene terephthalate), PBT (polybutylene terephthalate), Nylon, polyacrylates, and polycarbonates. An example of an alternative embodiment of a dampener 200 having a first solid component that includes the first bosses can be seen in FIGS. 9A-9D.

Similarly, each of the second bosses 232 is linked to a shared part, referred to as the second solid component (not shown, but shown in FIG. 9A-9D as 230). The second solid component is distinct part from the first solid component. The second solid component may be a plate that is disposed on a distal end of the second bosses 232. In embodiment, the second bosses 232 may form a single, integral, unitary piece with the second solid component. For example, the second solid component may be a larger component that includes the second bosses 232. In an embodiment, the second solid component (including the second bosses 232) may be molded from a polymeric material. The second solid component (including the second bosses 232) may be formed from any polymeric material suitable polymeric material. Non-limiting examples of suitable polymeric materials include: PET (polyethylene terephthalate), PBT (polybutylene terephthalate), Nylon, polyacrylates, and polycarbonates. In an embodiment, the second solid component may be formed from a different polymeric material than the first solid component. An example of an embodiment dampener having a second solid component that includes the second bosses can be seen in FIGS. 9A-9D.

Referring now to the tensile member 240 shown in FIGS. 2A-2C, the tensile member 240 is configured as a plate-like component having a cylindrical shape with a cross-sectional diameter (measured in the radial direction R) that is greater than its depth (measured in the axial direction, which extends orthogonally to the radial direction R through the opening 212 of the core 210). The three-dimensional shape of the tensile member 240 shown in FIGS. 2A-2C may be described as a cylindrical disk.

Figure 3A:
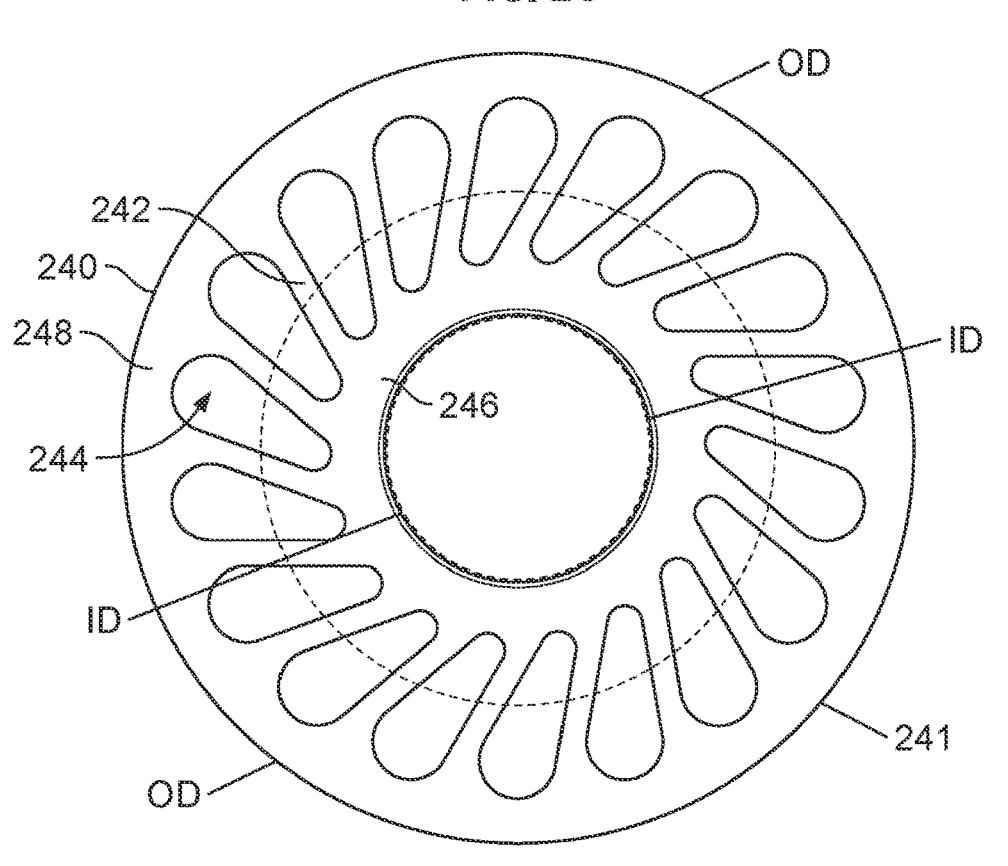
FIG. 3A is a front plan view of a tensile member for a dampener shown in FIG. 2A.
Figures 3B, 3C:
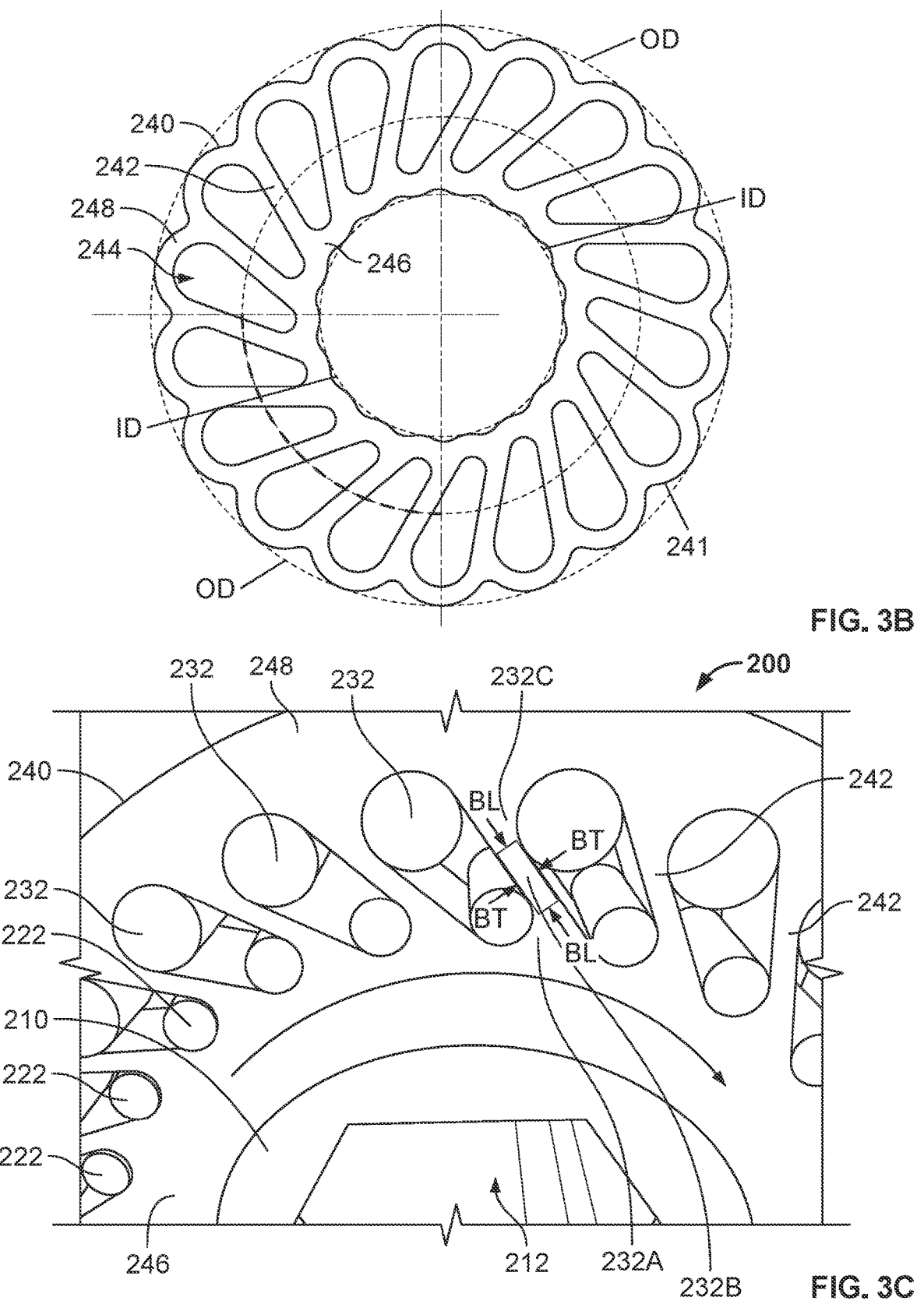
FIG. 3B is a front plan view of an exterior portion of an alternative tensile member similar to that shown in FIG. 3A.
FIG. 3C is a close-up, front cross-sectional view of the preferred embodiment dampener of FIGS. 2A-2C.

As can be seen in FIGS. 3A and 3B, the tensile member 240 of dampener 200 has an overall diameter OD (or outermost diameter), as measured around the outermost circumference of the outer portion 248 of the tensile member 240, when the band is in rest/home position. The tensile member 240 may have any overall diameter OD suitable for a particular application. In some embodiments, the tensile member 240 may have an overall diameter OD from about 10 mm to about 200 mm, or from about 20 mm to about 200 mm, or from about 25 mm to about 150 mm. In a particular embodiment, the tensile member 240 may have an overall diameter OD from about 30 mm to about 100 mm or from about 30 mm to about 80 mm. Additionally, an outer edge 241 of the tensile member 240 (i.e. the outer edge of exterior portion 248 of the tensile member 240) may be configured to have a variety of different shapes. For example, as shown in FIG. 3A the outer edge of tensile member 240 may be configured as a circle. Alternatively, as shown in FIG. 3B, an exterior portion 248 of tensile member 240 may configured to have a scallop-shape (i.e. a shape substantially similar to that of a series of sinusoidal waves) or be configured to have a substantially trussed-shape. Beneficially, a tensile member 240 having an exterior portion 248 with an outer edge 241 that is shaped according to FIG. 3B may require less material to form and therefore have less mass included in the exterior portion 248, which can be advantageous in terms of cost savings and for use in applications with weight restrictions. FIGS. 3A and 3B merely illustrate two potential shapes for the outer edge of exterior portion 248 of tensile member 240, and in order embodiments said outer edge may have any shape suitable for use in a particular application.

The tensile member 240 of dampener 200 has an inner diameter ID, as measured around the outermost circumference of the inner portion 246 of the tensile member 240, when the band is in rest/home position. The tensile member 240 may have an inner diameter ID from about 1 mm to about 100 mm, or from about 5 mm to about 50 mm. In a particular embodiment, the tensile member 240 may have an inner diameter ID from about 10 mm to about 25 mm or of about 20 mm.

The tensile member 240 of dampener 200 has plurality of bands 242. In an embodiment, a single tensile member 240 may have from 1 to 75 bands, or from 1 to 60 bands, or from 2 to 50 bands, or from 5 to about 50 bands, or from about 10 to about 45 bands, or from about 15 to about 40 bands, or from 20 to 35 bands. In a particular embodiment, a single tensile member 240 may have from 20 to 30 bands or about 25 bands. In an embodiment, the tensile member 240 may have approximately the same number of bands 242 and voids 244. Some embodiment dampeners can include two or more tensile members 140. In some embodiment dampeners, two or more tensile members 140 can be stacked on top of each other, to increase torque and/or to change the spring rate by coupling a low durometer disk with a high modulus silicone disk.

The tensile member 240 of dampener 200 has plurality of voids 244. In an embodiment, the tensile member 240 may have from about 2 to about 500 voids, or from about 2 to about 251 voids, or from about 2 to about 100 voids, or from about 2 to about 50 voids, or from about 5 to about 50 voids, or from about 10 to about 50 voids, or from about 20 to about 50 voids. In a particular embodiment, the tensile member 240 may have from about 20 to about 30 voids or about 25 voids. In an embodiment, the tensile member 240 may have approximately the same number of voids 244 and bands 242.

Referring again to FIGS. 2A-2C, dampener 200 has tensile member 240 including a plurality of bands 242 and voids 244, with a set of first bosses 222 and a set of second bosses 232 configured such that one first boss 222 and one second boss 232 are positioned in each void 244 of the tensile member 240. With respect to the function of dampener 200 and tensile member 240, tensile member 240 (especially the bands 242) functions in a similar manner to the tensile member 140 of dampener 100, described above. Specifically, FIG. 2A shows the dampener 200 in a rest position or a home position. FIG. 2B shows the same dampener 200 after having undergone a relatively minor rotation, in terms of radial degrees. FIG. 2C shows the same dampener 200 after having undergone a relatively large rotation, in terms of radial degrees. As shown in FIGS. 2B and 2C, as the dampener 200 is rotated, the bands 242 of the tensile member 240 are stretched and/or deformed. The force required to stretch the bands 242 contributes, at least in part, to the torque required to rotate the dampener 200 (i.e. contributes to the dampening effect of the dampener 200). Additionally, as shown in FIG. 2C, sufficiently large rotations of dampener 200 result in bands 242 being stretched/deformed such that each band 242 directly contacts one or more other bands 242. In addition to the force required to stretch the bands 242, bands 242 that contact one another also generate frictional and compressive forces, which also contribute to the torque required to rotate the dampener 200 and thus to the dampening effect of the dampener 200.

Referring now to FIG. 3C, the bands 242 of tensile member 240 are shown to have an hourglass or isthmus shape, however, in other embodiments the bands may be configured to have any suitable shape. The bands 242 are configured to have a lower portion 242A (i.e., the portion of the band 242 proximate to the inner portion 246 of the tensile member 240). As illustrated in FIG. 3C, the lower portion 242A of the band 242 is substantially wedge-shaped or substantially triangular. Similarly, the bands 242 are configured to have an upper portion 242C (i.e., the portion of the band 242 proximate to the outer portion 248 of the tensile member 240) that may also be substantially wedge-shaped or substantially triangular. In other embodiments, the bosses 222, 232 and the voids 244 may be configured such that the lower portion 242A and upper portion 242C can have any suitable shapes. Between the lower portion 242A and the upper portion 242C, the band is configured to have a central portion 242B (which may also be referred to as a leg 242B of the band 242). In the embodiment shown in FIGS. 2A-2C and FIGS. 3A-3C, the central portions 242B of the bands 242 are configured to be substantially rectangular, as can be most clearly seen in FIG. 3C.

As can be seen in FIG. 3A and in FIG. 3C, the bands 242 of tensile member 240 have a band thickness BT and a band length BL. Band thickness BT is the thickness as measured at the midpoint of the central portion 242B of the band 242, when the band is in rest/home position. The bands 242 of tensile member 240 may have any thickness suitable for a particular application. In some embodiments, the bands 242 of tensile member 240 may have a band thickness BT from about 0.5 mm to about 20 mm, or from about 1 mm to about 15 mm, or from about 1.5 to about 12 mm. In a particular embodiment, the bands 242 of tensile member 240 may have a band thickness from about 2.5 mm to about 4 mm or of about 3 mm. A band length BL is measure from the uppermost edge of the central portion 242B the band 242, that is to say the edge of central portion 242B that is most proximate to the upper portion of 242C of the band 242 but that still has a consistent band thickness BT (i.e. the lateral edges of the band are not substantially arcuate at that point) to the bottom most portion of the central portion 242B the band 242 (i.e. the edge of the central portion 242B of band 242 most proximate to the lower portion 242A) but that still has a consistent band thickness BT (i.e. the lateral edges of the band are not substantially arcuate at that point), when the band 242 is in rest/home position. The bands 242 of tensile member 240 may have any band length BL suitable for a particular application. In some embodiments, the bands 242 of tensile member 240 may have a band length BL from about 1 mm to about 100 mm, or from about 1 mm to about 50 mm, or from about 2 mm to about 25 mm, or from about 3 mm to about 20 mm, or from about 4 mm to about 15 mm. In a particular embodiment, the bands 242 of tensile member 240 may have a band length from about 3 mm to about 8 mm or of about 5 mm.

Figure 4A:
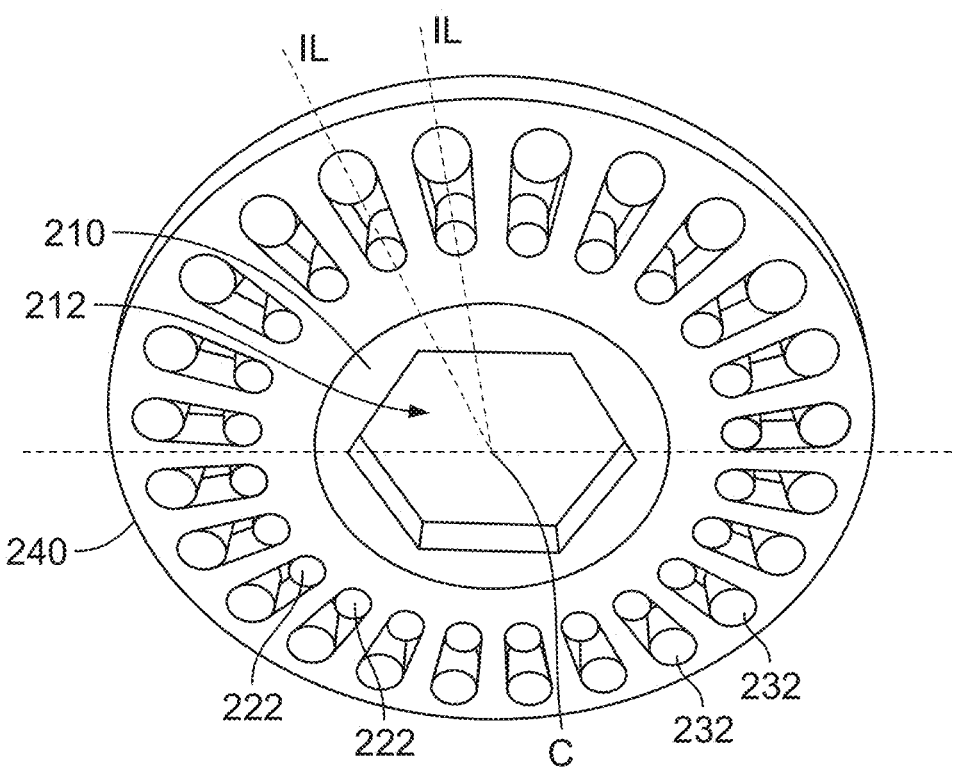
FIG. 4A is a front perspective view of an alternative embodiment dampener having a zero-degree approach angle.
Figure 4B:
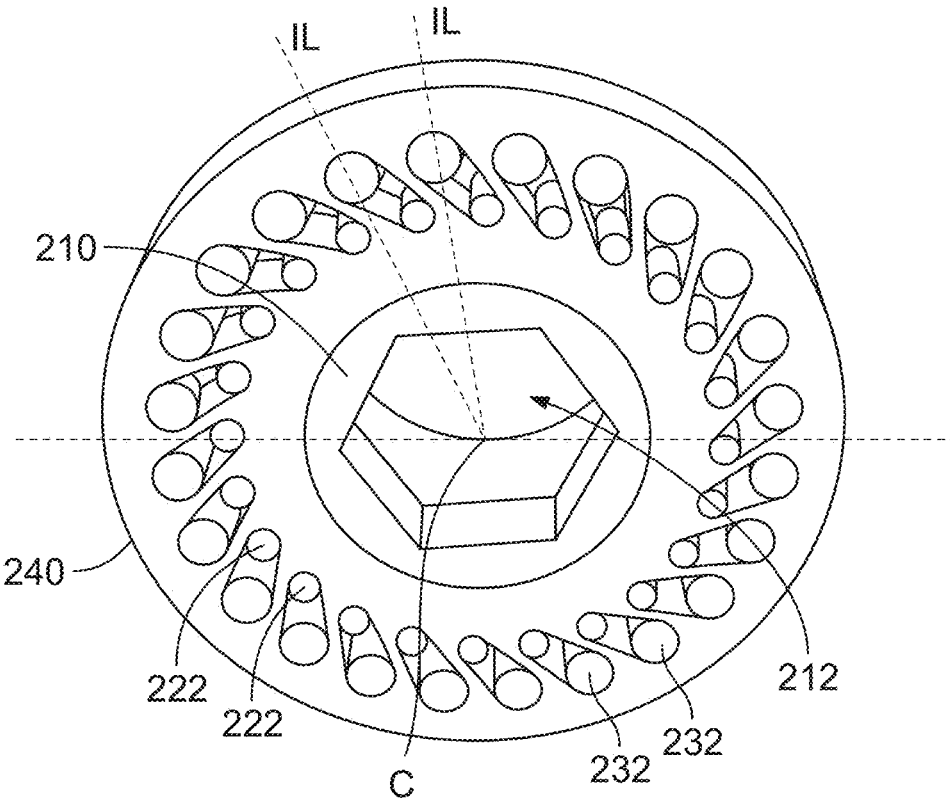
FIG. 4B is a front perspective view of the dampener of FIG. 4A having a 20-degree approach angle.

As can be seen in FIG. 2A, the tensile member 240 is configured such that bands 242 are disposed at an angle relative the core 210. However, as illustrated in FIGS. 4A and 4B, an alternative configuration of the tensile member may be configured such that the bands 242 are not angled relative to the core 210 (or have a 0° angle to core), as shown in FIG. 4A, or at an angle as shown in FIGS. 2A and 4B. For example, as illustrated in FIG. 4A, the center of the first boss 222 and the center of the second boss 232 can be aligned along an imaginary line IL extending from the center C of the central opening 212. An approach angle of the bands 242 can alter the performance of the tensile member and therefore the dampener. For example, a tensile member 240 configured such that the bands 242 are arranged at a zero-degree angle may require substantially equal torque to stretch/elongate its bands via a clockwise rotation of the dampener 200 as via a counterclockwise rotation of the dampener 200.

Figure 5:
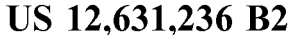
FIG. 5 is a calculated stress-strain curve for a low modulus silicone polymer.

Referring to FIG. 5, shown is a stress-strain curve for a silicone polymer useful in tensile members of embodiment dampeners. As can be seen, the first 50% of the stress-strain curve is relatively flat. As such, stretching/elongation of the tensile member through this portion of the curve requires relatively little force and therefore provides relatively little torque/dampening effect to the embodiment dampener during said stretching. An embodiment dampener with a tensile member configured such that the bands stretch/deform through a large amount of this portion of the stress-strain curve during rotation of the dampener may be useful for initially permitting rotational movement with less dampening for the early stage of the spring/application's rotation and then the providing increased dampening effect as the spring/application nears the end of its travel.

Alternatively, an embodiment dampener can be configured with a tensile member 240 having bands that are disposed at an angle relative to the core. For example, the tensile member 240 can having bands 242 that are disposed at an angle from about 0° to about 85°, or from about 0° to about 75°, relative to the core 210. In the embodiment shown in FIG. 4B, the tensile member 240 has bands configured at about a 20-degree angle relative to the core. As such, FIG. 4B shows a preloaded tensile member 240. A pre-loaded tensile member 240 may be useful in embodiment dampeners intended to dampen rotational movement in only one direction (i.e. only counterclockwise dampening or only clockwise dampening). The greater the approach angle of the bands, the more quickly the bands are loading during rotation, as a result of the silicone stress-strain curve having a greater slope of higher loading positions, as shown in FIG. 5. Alternatively, the tensile member 240 can have bands 242 that are curved, rather than the straight bands shown in FIGS. 2A-2C, FIGS. 3A-3C, and FIGS. 4A-4B. Curved bands experience low torque during the early portion of the movement of the dampener, because straightening the curved bands would provide a near zero torque, and therefore the dampener would not experience substantial torque until the dampener has rotated far enough for the bands to become straightened. Band-curvature, and the ensuing zero-torque rotation is an example of a "free-run rotation" or "free-run feature", which are further described below.

Figures 6A, 6B, 6C:
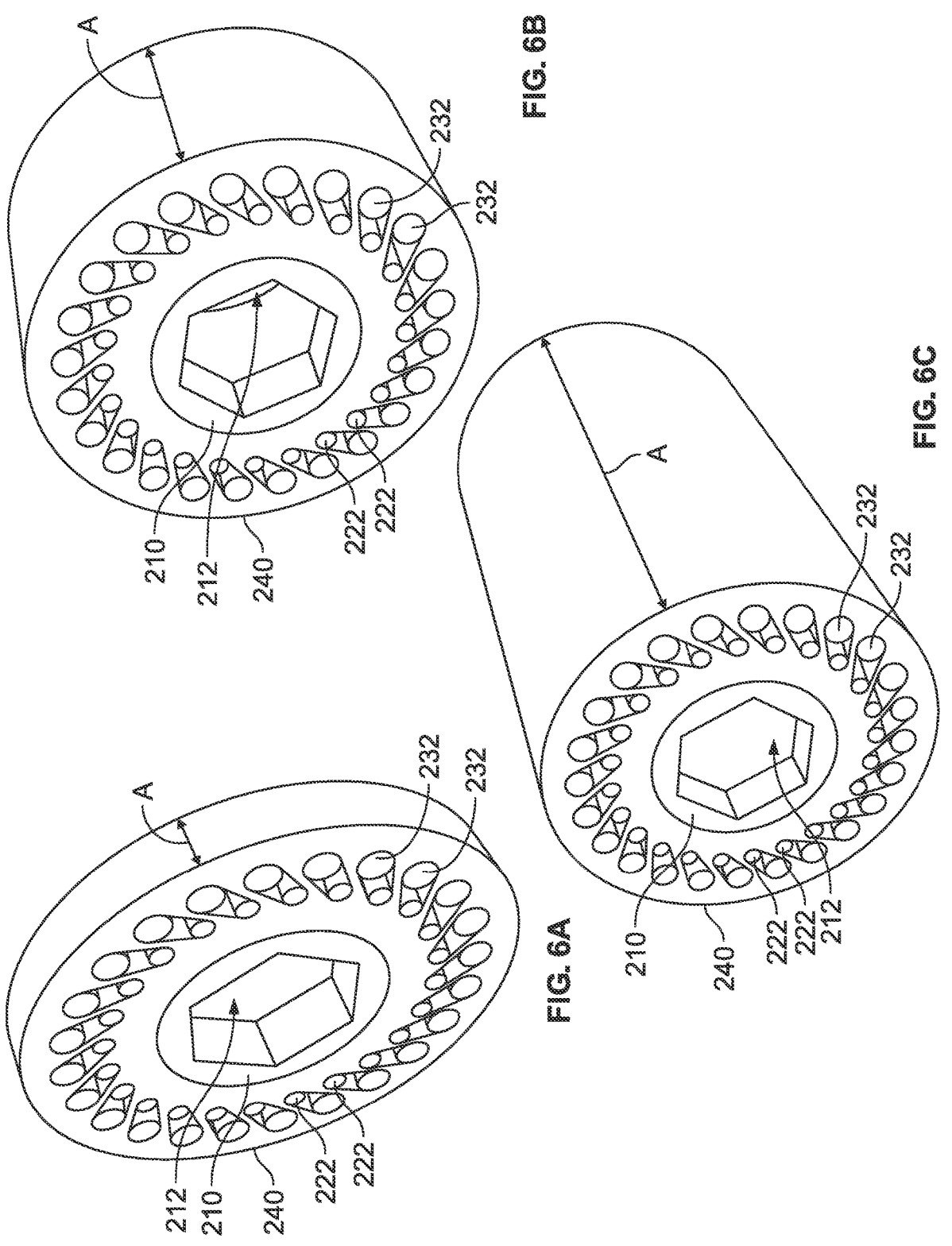
FIG. 6A is a top, front, and right perspective view of an embodiment dampener that is similar to the dampener shown in FIG. 2A and having a first depth.
FIG. 6B is a top, front, and right perspective view of an embodiment dampener similar to that of FIG. 6A but having a greater depth.
FIG. 6C is a top, front, and right perspective view of an embodiment dampener similar to that of FIG. 6B but having a greater depth.

Referring to FIGS. 6A-6C, additional three-dimensional shapes for tensile members useful in embodiment dampeners are shown. FIG. 6A shows a tensile member having a three-dimensional shape that is similar to that embodiment dampener 200 shown in FIGS. 2A-2C. FIG. 6B shows a tensile member having a three-dimensional shape with a depth (measured in the axial direction A) that is greater than depth of the tensile member shown in FIG. 6A. FIG. 6C shows a tensile member having a three-dimensional shape with an even greater depth (measured in the axial direction A) than that of the tensile member shown in FIG. 6B. Importantly, depth of the tensile member is positively correlated with the total amount of torque required to deform/strength the tensile member (especially the bands of the tensile member) as the dampener is rotated. As such, as the depth of the tensile member increases the total amount of torque (e.g. the total dampening affect) of an embodiment dampener also increases.

Figure 7:
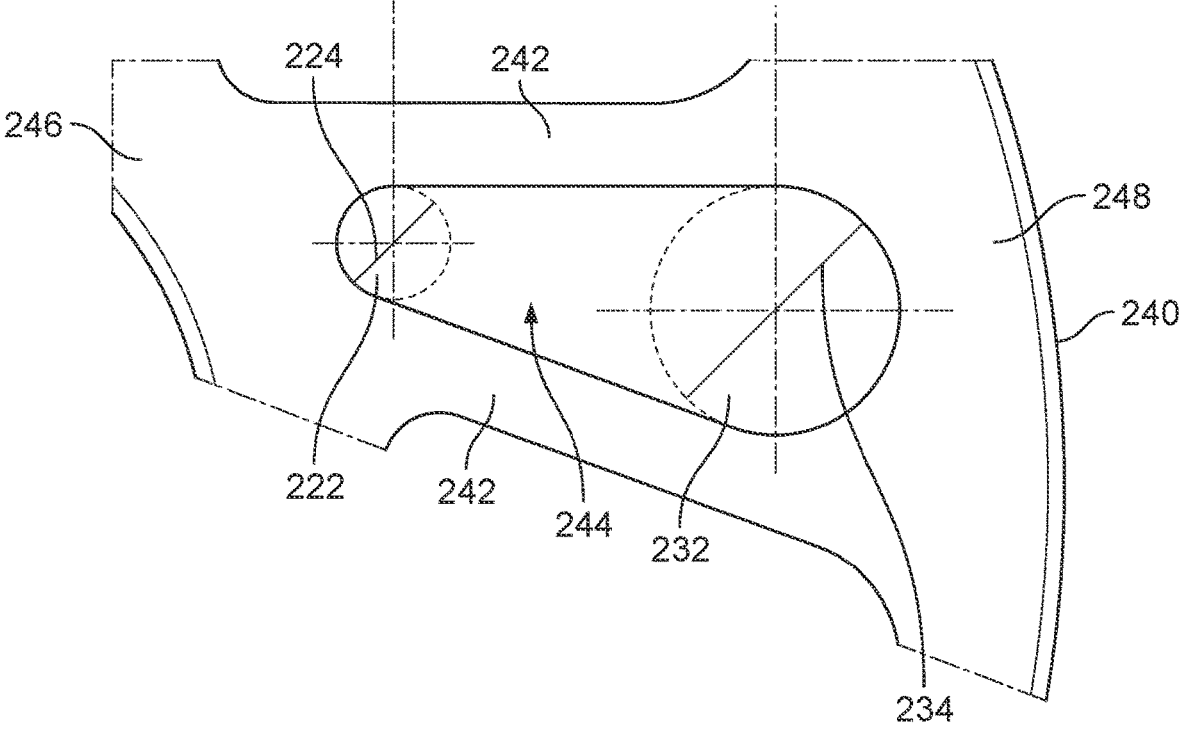
FIG. 7 is a close-up, front plan view of exterior portion of the tensile member.

Referring to FIG. 7, voids 244 of tensile member 240 are configured to have a teardrop shape (e.g., two circles with two external tangents). However, in other embodiments, voids 244 may have any suitable shape. For example, the voids 244 may have a substantially elliptical shape, or a substantially rectangular shape. Additionally, as can be seen in FIG. 7, the voids 244 of tensile member 240 have a void length as measured at the center-point of the first boss 222 that is positioned within the void 244 to the center point of the second boss 232 that is positioned within the void 244, when the band is in rest/home position. This distance may also be referred to as the molded length of the first bosses 222 and the second bosses 232. The void 244 may have a molded length from about 1 mm to about 75 mm, or from about 2 mm to about 60 mm, or from about 3 mm to about 50 mm, or from about 3 mm to about 25 mm, from about 5 mm to about 15 mm, or from about 8 mm to about 12 mm.

Figures 8A, 8B, 8C:
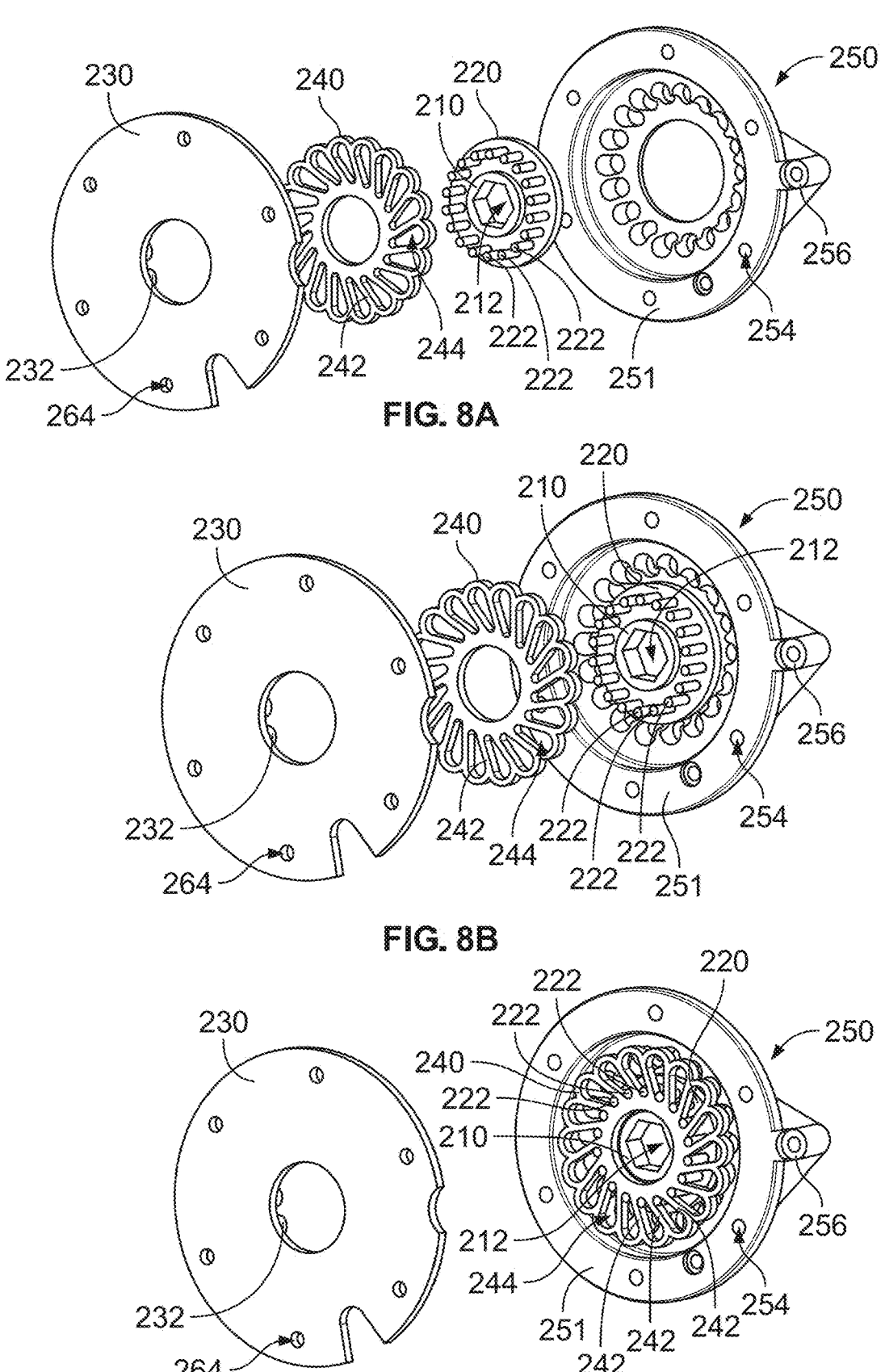
FIG. 8A is a fully exploded isometric view of a dampener assembly similar to the dampener shown in FIGS. 2A-2C.
FIG. 8B is an isometric view of the dampener assembly of FIG. 8A with a barrel having been inserted into a housing.
FIG. 8C is an isometric view of the dampener assembly of FIG. 8B with a tensile member positioned on the barrel.

Referring now to FIGS. 8A-8D, shown is an embodiment of a dampener assembly 250 including a dampener similar to the dampener of FIGS. 2A-2C and FIGS. 3A-3C. FIG. 8A shows a fully exploded view of the dampener assembly 250. The dampener assembly 250 includes the dampener 200 which is made up of a first solid component 220 having first set of bosses 222, the second solid component 230 having second set of bosses 232, with the first and second solid components 220, 230 being configured such that the side of the first set of bosses 222 extend toward the second solid component 230 and the second set of bosses 232 extend toward the first solid component 220. As shown in FIG. 8A, the dampener assembly 250 including dampener 200 also has tensile member 240 positioned between the first solid component 220 and the second solid component 230. FIG. 8B shows the dampener assembly 250 of FIG. 8A with the first solid component 220 positioned on the housing 251.

FIG. 8C shows the dampener assembly 250 of FIGS. 8A and 8B with the tensile member 240 positioned on the first solid component 220, which itself positioned on the housing 251. The tensile member 240 is configured and positioned such that each boss in the first set of bosses 222 extends through a void 244 of the tensile member 240 and is thereby separated from every other boss of the first set of bosses 222 by at least one band 242 of the tensile member 240.

Figure 8D:
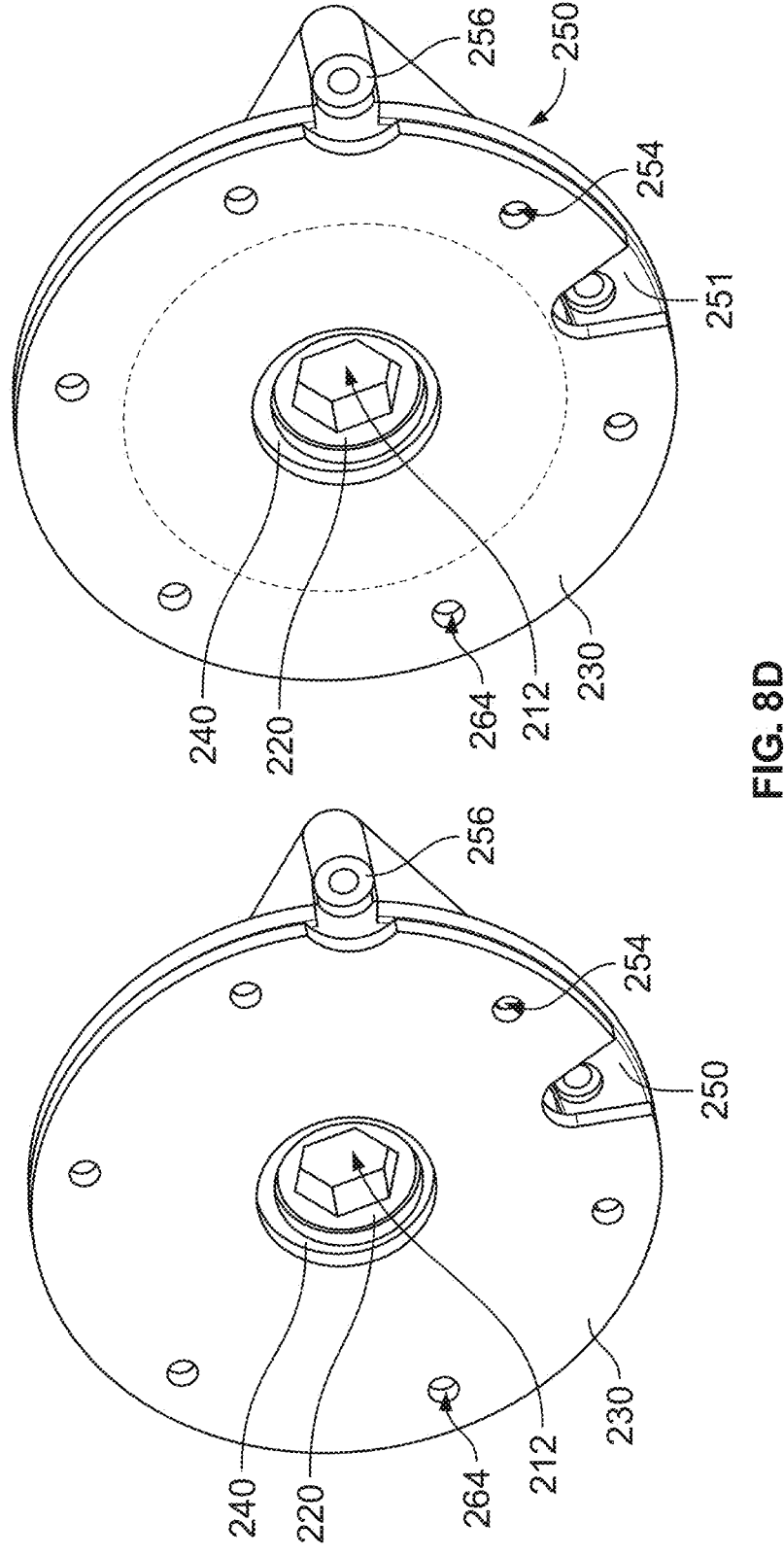
FIG. 8D is an isometric view of the dampener assembly of FIG. 8C with a disk component positioned on the housing.

FIG. 8D shows the dampener assembly 250 of FIGS. 8A-8C with the second solid component 230 positioned on the housing 251, along with the tensile member 240 and the first solid component 220. The second solid component 230 is configured and positioned such that each boss in the second set of bosses 232 extends through a void 244 of the tensile member 240 and is thereby separated from every other boss of the second set of bosses 232 by at least one band 242 of the tensile member 240. In the embodiment dampener assembly 250 shown in FIG. 8D, one first boss 222 and one second boss 232 extend through each void 244 in the tensile member 240. Alternatively, in some embodiments, one or more voids 244 may not have a first boss and/or a second boss 222, 232 extending therethrough. After being assembled, the dampener assembly 250 is fastened shut. In the embodiment shown in FIG. 8D, the dampener assembly 250 is fastened shut by securing second solid component 230 to the housing 251 via securing openings 254 on the housing 251 and complementary securing openings 264 on the second solid component 230. The dampener assembly 250 can then be mounted on an application, for example onto a vehicle seat or a vehicle closure, via mounting features 256.

Figure 9A:
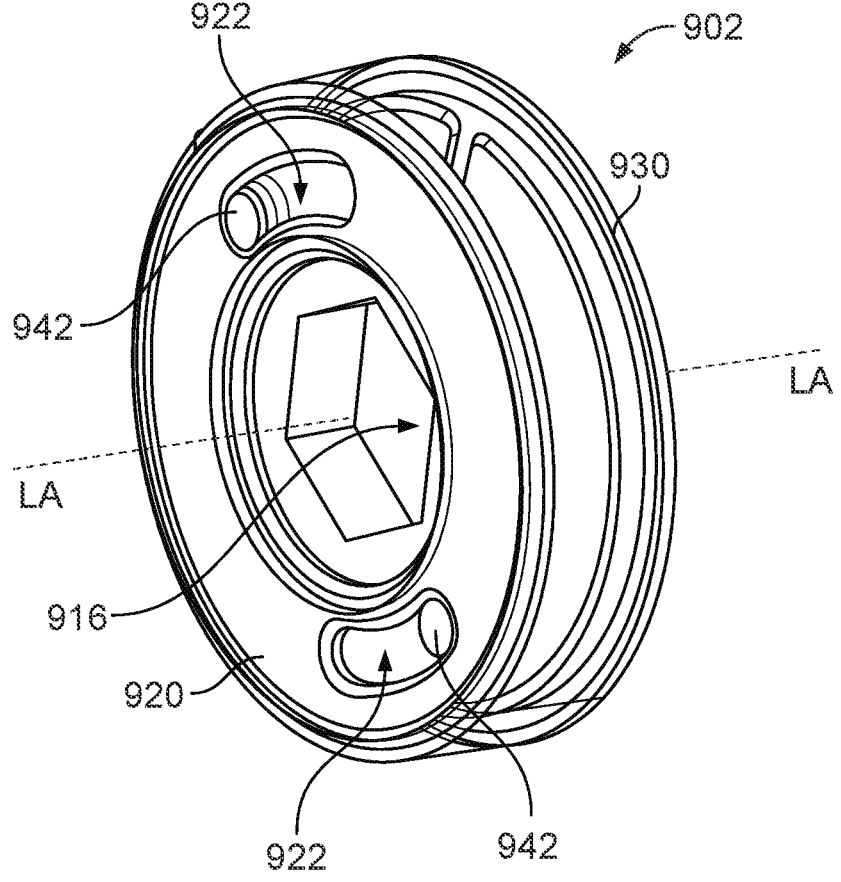
FIG. 9A is a top, front, left perspective view of the dampener similar to the dampeners of 2A-2C and 8A-8D standing alone.

Now referencing FIGS. 9A-9D, an alternative embodiment of a dampener assembly similar to the dampener of FIGS. 8A-8D is shown, however, FIGS. 9A-9D show the dampener 200 configured to includes a "free run" or "loss motion" feature. Referring first to FIG. 9A, a dampener 900 has a compression limiter (not visible from the angle shown in FIG. 9A but shown in FIG. 9B as 910). The dampener 900 also has a first disk 920 and a second disk 930, disposed at a first end and second end of the compression limiter, respectively, as well as a tensile member (not visible from this angle). The tensile member of the dampener 900 is substantially the same as the tensile member of the dampener 100, shown in FIGS. 8A-8C. Specifically, the tensile member of the dampener 900 is connected to the first disk 920 and the second disk 930. Similar to the tensile member 240 of the dampener 200, the tensile member of the dampener 900 is configured such that it may wrap around the compression limiter when the dampener 900 is twisted about a longitudinal axis LA. In this way, the tensile member of the dampener 900 provides substantially the same benefits to the dampener 900 as the tensile member 240 provides to the dampener 200. The dampener 900 has a hole 916, which is hexagonal in shape. This hole 916 is configured to accept a fastening mechanism (e.g., a bolt), which may be used to mount the dampener 900 onto an application, such as an automobile seat. The hole 916 may be rotated by the application as the application acts/moves. For example, the hole 916 may be rotated by an automobile seat as the seat hingedly folds/unfolds. In another embodiment, the hole 916 may be a different shape.

Figure 9B:
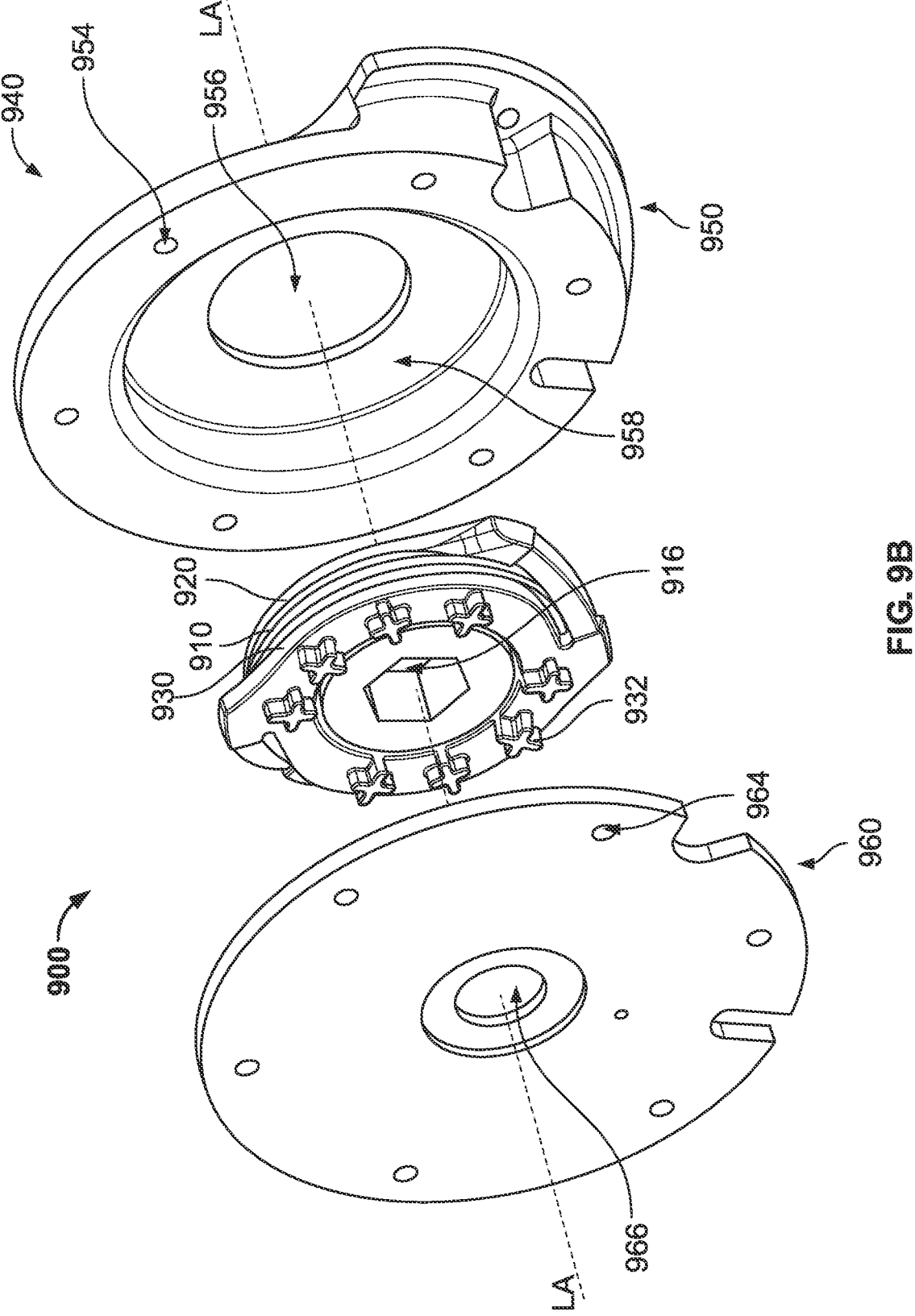
FIG. 9B is a top, front, left perspective view of the dampener positioned between unassembled parts of an assembly.

Referring next to FIG. 9B, the dampener 900 is shown, from a bottom view, positioned as part of the dampener assembly 940. Specifically, the dampener 900 is positioned between a cap 950 and a base plate 960. Collectively, the dampener 900, the cap 950, and the base plate 960 form the dampener assembly 940. The cap 950 has a cap opening 956 disposed approximately in the center of the cap 950 and through which a portion of the first disk 920 and entirety of the hole 916 of the dampener 900 are visible and accessible. The cap opening 956 is shown in FIG. 9B as being circular. However, the cap opening 956 may alternatively form any suitable shape, including but not limited to, an ellipse, a square, a rectangle, a hexagon, or an octagon. The cap 950 also has a plurality of peripheral cap openings (not visible from this angle, see FIG. 9C referred to as 954) disposed circumferentially around the periphery of the cap 950. The base plate 960 has a base plate opening 966 disposed approximately in the center of the base plate 260 and through which at least a portion of the hole 916 of the dampener 900 is visible/accessible. At least a portion of the hole 916 can be simultaneous aligned with both the cap opening 956 and the base plate opening 966 about the longitudinal axis LA, such that an object and/or a fastening mechanism (such as a bolt) can extend through each of the hole 916, the cap opening 956, and the base plate opening 966 simultaneously. The base plate 960 also has a plurality of peripheral base plate openings 964 disposed circumferentially around the periphery of the base plate 960. The peripheral cap openings 954 can be aligned with the peripheral base plate openings 964, so that objects (such as screws) can extend simultaneously through each pair of peripheral a cap opening 954 and a peripheral base plate opening 964, so that the cap 950 may thereby be secured to the base plate 960. The cap 950 and/or the base plate 960 are shaped such that the entirety of the dampener 900 may be enclosed between the cap 950 and the base plate 960 when the cap 950 is secured to the base plate 960 via the pairs of peripheral cap opening 954 and peripheral base plate opening 964 (i.e. when the assembly is in an assembled state). For example, in the embodiment shown in FIGS. 9B-9D, the cap 950 has a cavity 958 in which the entirety of the dampener 900 may be enclosed when the dampener assembly 940 is in an assembled state.

Additionally, the dampener 900 has a plurality of securing members 932 disposed on the bottom surface of the second disk 930. The securing members 932 protrude away from the bottom surface of the second disk 930. In the embodiment shown in FIG. 9B, the securing members 932 are substantially T-shaped or cross-shaped. In other embodiments, the securing members 932 could have any suitable shape, including square, rectangular, hexagonal, or octagonal.

Figure 9C:
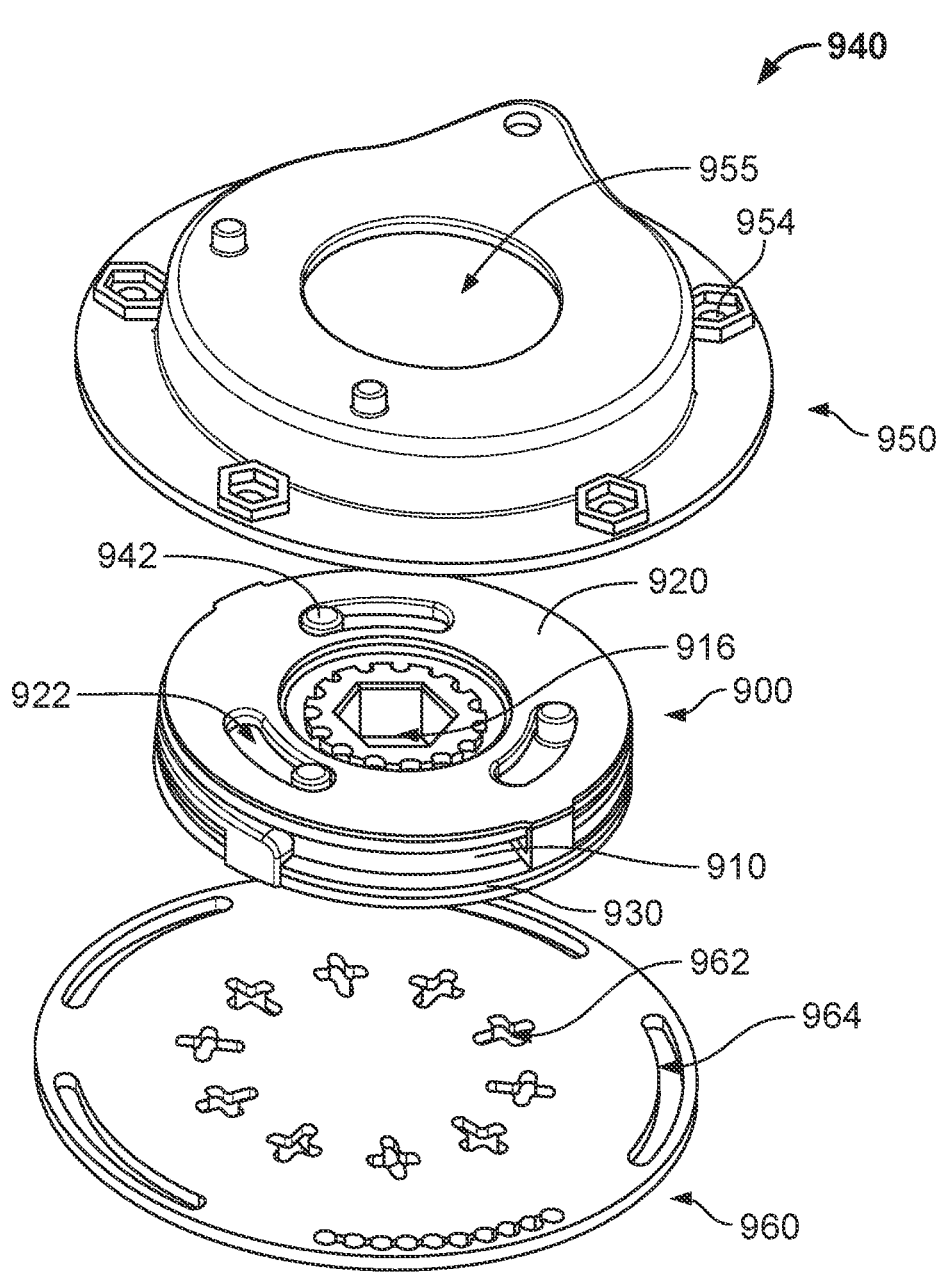
FIG. 9C is a top, front perspective view of the dampener positioned between unassembled parts of the assembly.

Referring now to FIG. 9C, the dampener assembly 940 of FIG. 9B is shown from a top view. Notably, a plurality of securing openings 962 are visibly disposed on the top surface of the base plate 960. The securing openings 962 have substantially the same shape and size as the securing members 932. The securing openings 962 may extend through the entire thickness of the base plate 960 and thereby form a plurality of holes in base plate 960. Alternatively, securing openings 962 may extend through only part of the thickness of the base plate 960 and thereby form a plurality of indentations/depressions in base plate 960. The securing openings 962 can be aligned with the securing members 932, such that the securing members 932 may be positioned within the securing openings 962.

Figure 9D:
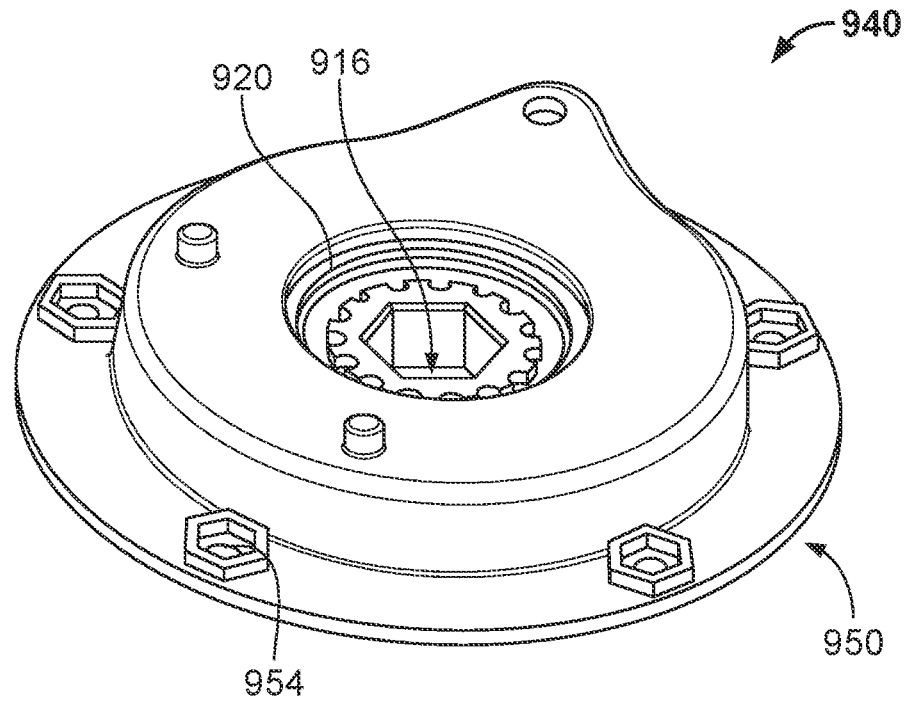
FIG. 9D is a top, front perspective view of the dampener positioned within the assembly once assembled.

Referring to FIG. 9D, the dampener assembly 940 (i.e., the dampener 900, the cap 950, and the base plate 960) are shown in an assembled state. The securing members 932 of the dampener 900 are positioned within the securing openings 962 of the base plate 960, and the second disk 930 of the dampener 900 is thereby secured/held in a fixed position by the base plate 960 (i.e., the second disk 930 is prevented from rotating as the dampener 900 is twisted). As such, at least a portion of the first disk 920 and/or the compression limiter 910, may move relative to the second disk 930 when the dampener 900 is driven (i.e., twisted about its longitudinal axis) by an application, such as an automobile seat. This motion stretches the tensile member and causes the tensile member to contact and wrap around the compression limiter 910, which facilitates at least a portion of the dampening effect of the dampener 900.

Referring again to FIGS. 9A and 9C, the first disk 920 has slots 922 and the compression limiter 910 has posts 942. As shown in FIG. 9A, the compression limiter 910 includes posts 942 that are disposed so that they pair with and pass through the first disk's slots 922. When the dampener 900 is twisted about its longitudinal axis LA such that the posts 942 travel along the slots 922, the dampener 900 is not loaded until it has been twisted sufficiently to cause the posts 942 to encounter the opposite end of the slots 922 (i.e., the first object/barrier encountered by the posts 942 is the edge of the slots 922). This unloaded portion of twisting by the dampener 900 is referred to herein as "free run." During free run the rotational speed of the dampener 900 and any torsion spring with which it may be combined are undampened. Once the dampener 900 has been sufficiently twisted such that the posts 942 encounter the ends of the slots 922, any further twisting of the dampener 900 begins to load the dampener 900 in a similar manner as described above, in reference to FIGS. 8A-8C. The length of the free run can be modulated by varying the length of the slots 922, with a longer slot length allowing a greater amount of free run. In some embodiments, the dampener 900 may have any number of pairs of posts 942 and slots 922. This is demonstrated by dampener 900 shown in FIG. 9A as having two pairs of posts 942 and slots 922, while dampener 900 is shown in FIG. 9C as having three pairs of posts 942 and slots 922, both of which are valid configurations for dampener 900. It is also contemplated that the dampener 900 may have any number of pairs of posts 942 and slots 922, such as 1 pair, or 4 pairs, or 5 pairs, or more. Advantageously, this gives the dampener 900 the ability to allow a torsion spring to have free run for a certain length of motion before engaging a dampening effect on the torsion spring's movement.

Figure 10A:
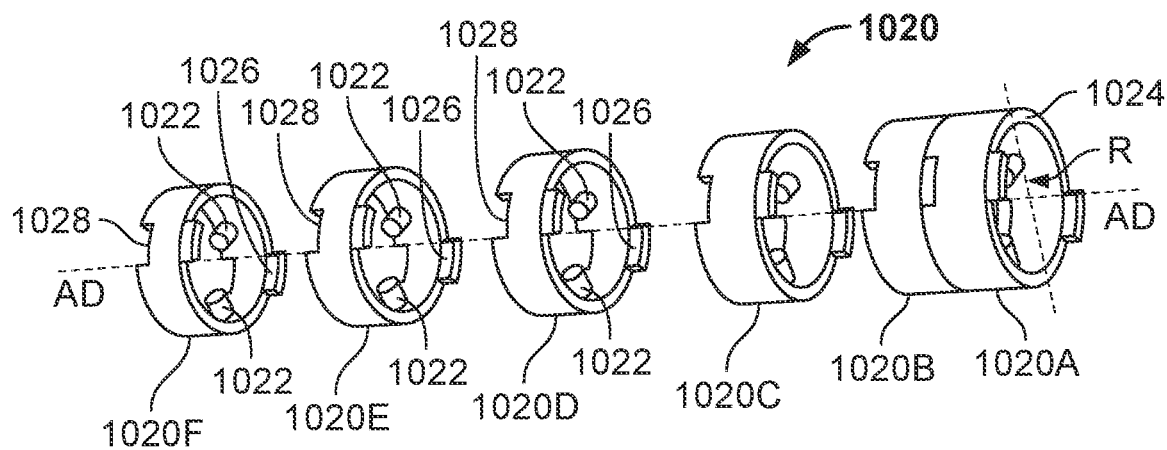
FIG. 10A is an exploded view of a first solid component of the dampener assembly.
Figure 10B:
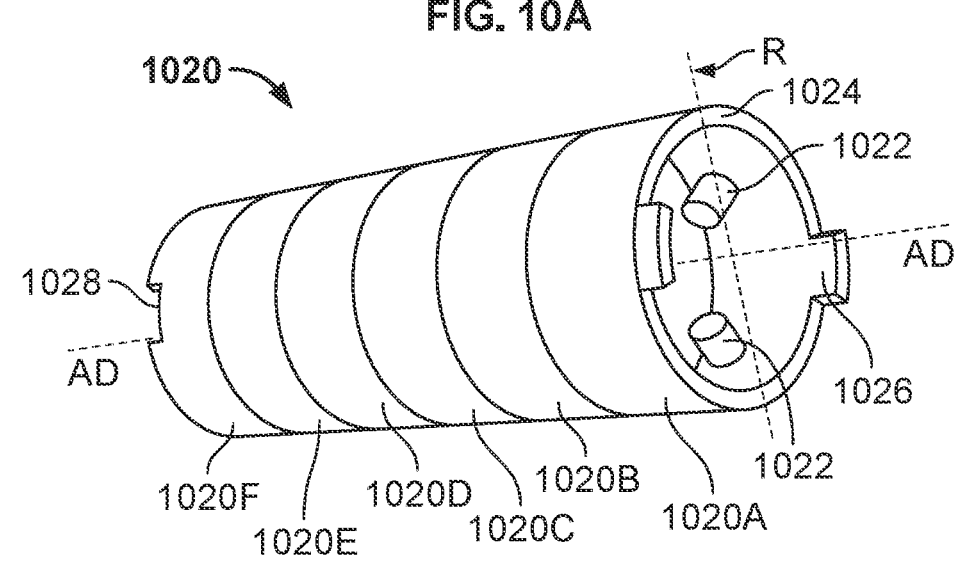
FIG. 10B is a front, right perspective view of a first solid component of the dampener assembly in an assembled state.

Referring now to FIGS. 10A-10F, an alternative embodiment of a dampener 1000 is shown. Referring first to FIGS. 10A and 10B, a first solid component 1020 for dampener 1000 is shown. The first solid component 1020 is configured as a hallow cylindrical structure or tube. The first solid component 1020 has a plurality of first bosses 1022 extending inwardly (i.e., toward the radial center first solid component 1020 in any radial direction R perpendicular to the axial direction AD) from it its outer cylindrical wall 1024.

The first solid component 1020 is formed from a plurality of first solid modular subcomponents (1022A, 102B, 102C, 1022D, 1022E, and 1022F). Each of the first solid modular subcomponents 1022A-1022F is configured as a cylindrical ring having substantially the same shape as the greater first solid component 1020 except having a lesser length in the axial direction AD. Each of the first solid modular subcomponents 1022A-1022F contains a plurality of first bosses 1022. Each of the first solid modular subcomponents 1022A-1022F also contains a linking feature 1026 and a receiving feature 1028 for coupling each first solid modular subcomponent (such as 1022A) to another first solid modular subcomponent (such as 1022B), in order to form the greater and/or longer first solid component 1020.

In the embodiment shown in FIG. 10A-10F each of the first solid modular subcomponents 1022A-1022F are substantially identical to each other. In some embodiments, each of the first solid modular subcomponent 1022A-1022F may be formed in a manner that is substantially identical such as using the same mold. One benefit of this modularity of the first solid modular subcomponents 1022A-1022F is that a greater first solid component 1020 of virtually any length can be formed, without varying the manufacturing processes used to form the first solid modular subcomponents 1022A-1022F.

Referring specifically to FIG. 10A, the first solid component 1020 is shown with the most of the first solid modular subcomponents (1022C, 1022D, 1022E, and 1022F) separated from one another. However, first solid modular subcomponents 1022A and 1022B are shown as being connected to one another via the linking feature 1026 of first solid modular subcomponent 1022B and the receiving feature 1028 of first solid modular subcomponent 1022A. Whereas, in FIG. 10B, all of the first solid modular subcomponents (1022A, 1022B 1022C, 1022D, 1022E, 1022F) are shown as being connected to one another via their linking features 1026 and receiving features 1028.

Figure 10C:
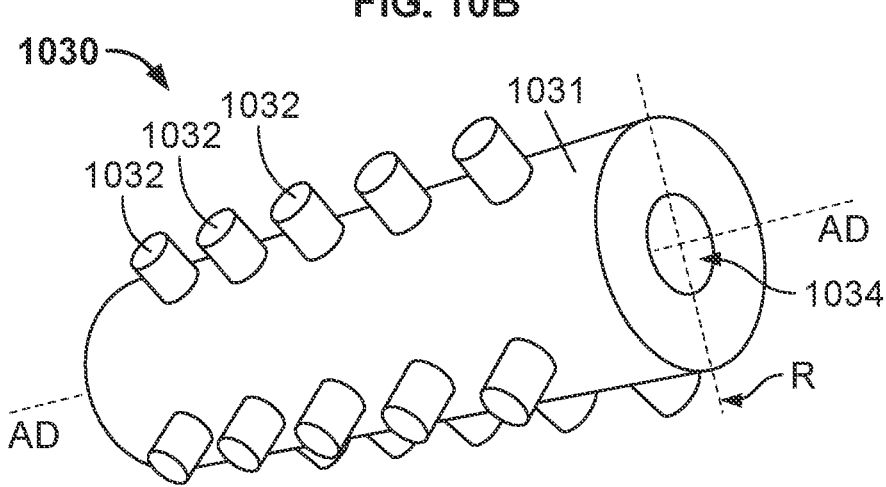
FIG. 10C is a front, right perspective view of a second solid component of the dampener assembly.

Referring next to FIG. 10C, a second solid component 1030 for dampener 1000 is shown. Like the first solid component 1020, the second solid component 1030 includes a body 1031 that is configured as a hollow cylindrical structure or tube. The second solid component 1030 has a plurality of second bosses 1032 extending outwardly (away from the radial center second solid component 1030 in any radial direction R) from its outer cylindrical wall 1024. In the embodiment shown in FIG. 10C, the second set of bosses 1032 is configured such that the second bosses 1032 are arranged in a plurality of rows that extend along the length of the second solid component 1030 in the axial direction AD. The second solid component 1030 also includes an opening 1034 that extends longitudinally through the length of the second solid component 1030 along the axial direction AD.

Figure 10D:
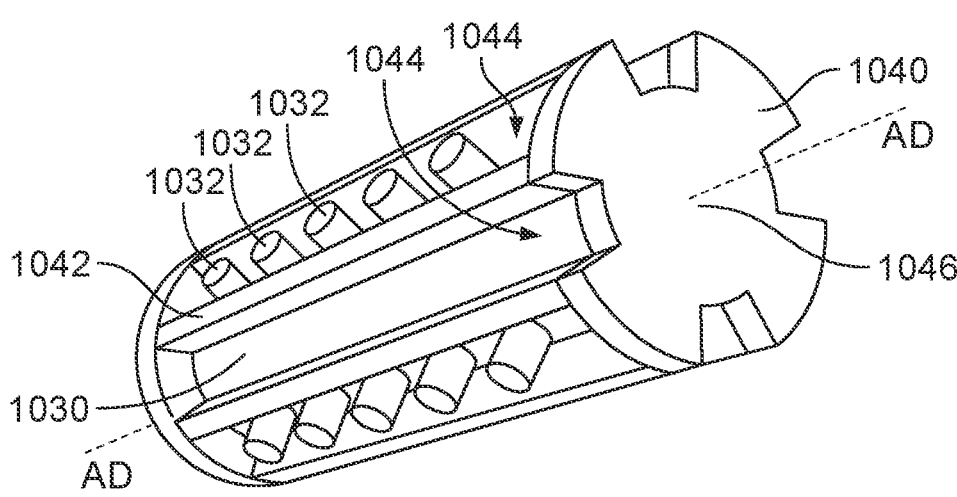
FIG. 10D is a front right perspective view of a tensile member mounted on the second solid component.

Turning now to FIG. 10D, tensile member 1040 and second solid component 1030 is shown. The tensile member 1040 is coupled with the second solid component 1030. Tensile member 1040 has bands 1042 that extend along the length of the second solid component 1030 in the axial direction AD. Each row of second bosses 1032 is buttressed on the right-side by at least one band 1042 and/or on the left-side by at least one band 1042. In the embodiment shown in FIG. 10C, each row of second bosses 1032 is buttressed on the right-side by one band 1042 and on the left-side by one band 1042. As such, in the embodiment shown in FIG. 10C, the tensile member 1040 comprises two bands 1042 for each row of bosses in the second set of bosses 1032.

The tensile member 1040 may also include one or more longitudinal caps 1046. The bands 1042 of the tensile member 1040 are linked to the longitudinal caps 1046. In some embodiments, the tensile member 1040 is a single, integral, unitary piece and therefore the bands 1042 are integral with the longitudinal caps 1046. In alternative embodiments, the bands 1042 may be attach to the longitudinal caps 1046. In embodiments without longitudinal caps 1046, the tensile member 1040 may be attached directly to the first solid component 1020 and/or the second solid component 1030, using any suitable method of attachment. The embodiment tensile member 1040 shown in FIG. 10C has two longitudinal caps 1046 positioned on each longitudinal end of the second solid component 1030 with a plurality of bands 1042 extending between longitudinal caps 1046. The tensile member 1040 is configured as a single, integral, unitary piece including the bands 1042 and the longitudinal caps 1046 disposed at each end of the bands 1042.

The tensile member 1040 has a plurality of voids 1044 between the bands 1042. The second solid component 1030 and the tensile member 1040 are configured such that the rows of second bosses 1032 are positioned within some of the voids 1044 of the tensile member. In the embodiment shown in FIG. 10D, not all the voids 1044 have a second boss 1032 extending therethrough. However, in alternative embodiments, each void 1044 may have a second boss 1032 extending therethrough.

Figure 10E:
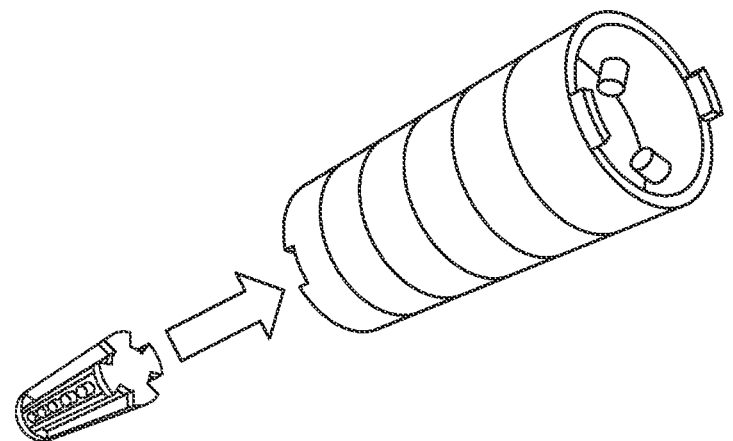
FIG. 10E is a front, right perspective view of both the first solid component and the second solid component separate from one another.
Figure 10F:
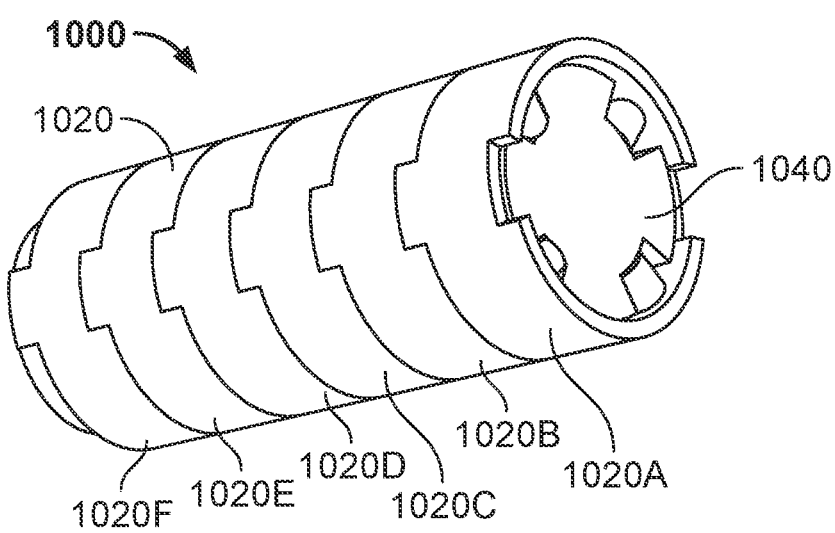
FIG. 10F is a front, right perspective view of the first solid component, second solid component, and tensile member of the dampener assembly in an assembled state.

Referring now to FIGS. 10E and 10F, the first solid component 1020, the second solid component 1030, and the tensile member 1040 are all shown. In FIG. 10E, the second solid component 1030, with the tensile member 1040 mounted thereon, is shown as being positioned longitudinally behind and in line with the first solid component 1020. In FIG. 10F, the second solid component 1030, with the tensile member 1040 mounted thereon, is shown as being positioned within the first solid component 1020. As shown in FIG. 10F, the first bosses 1022 of the first solid component 1020 extend radially inward toward the second solid component 1030, while the second bosses 1032 of the second solid component 1030 extend radially outward toward the first solid component 1020. The tensile member 1040 is positioned between the second solid component 1030 and the first solid component. The first solid component 1020 and the second solid component 1030 are configured and positioned such that the first bosses 1022 of the first solid component 1020 extend into at least some of the voids 1044 of the tensile member 1040. The first bosses 1022 of the first solid component 1020 may extend into at least some of the voids 1044 of the tensile member 1040 that do not have a second boss 1032 of the second solid component 1030 extending therethrough. In the embodiment shown in FIG. 10F, first bosses 1022 of the first solid component 1020 extend into all the voids 1044 of the tensile member 1040 that do not have a second boss 1032 of the second solid component extending therethrough. However, in some embodiments, a dampener 1000 may have a plurality of first bosses 1022 and a plurality of second bosses 1032 extending into each void 1044 of the tensile member 1040.

Moving to FIG. 11, a side shield 1100 for an automotive seat is shown. A dampener 1110 is deployed in the side shield. The dampener 1110 may be used to slow the movement speed of the automotive seat, where the automotive seat's movement is driven by a rotational spring. FIGS. 12A-B shows the movement of an automotive seat both with and without a tension spring dampener. FIG. 12A illustrates that a dampener of the present disclosure can slow the rotational movement speed of the automotive seat, beneficially creating a safer, smoother, and more luxurious feeling movement. FIG. 12B illustrates the automotive seat without the tension spring dampener with rapid rotational movement speed of the automotive seat, which may result in a jerking movement.

Figure 13A:
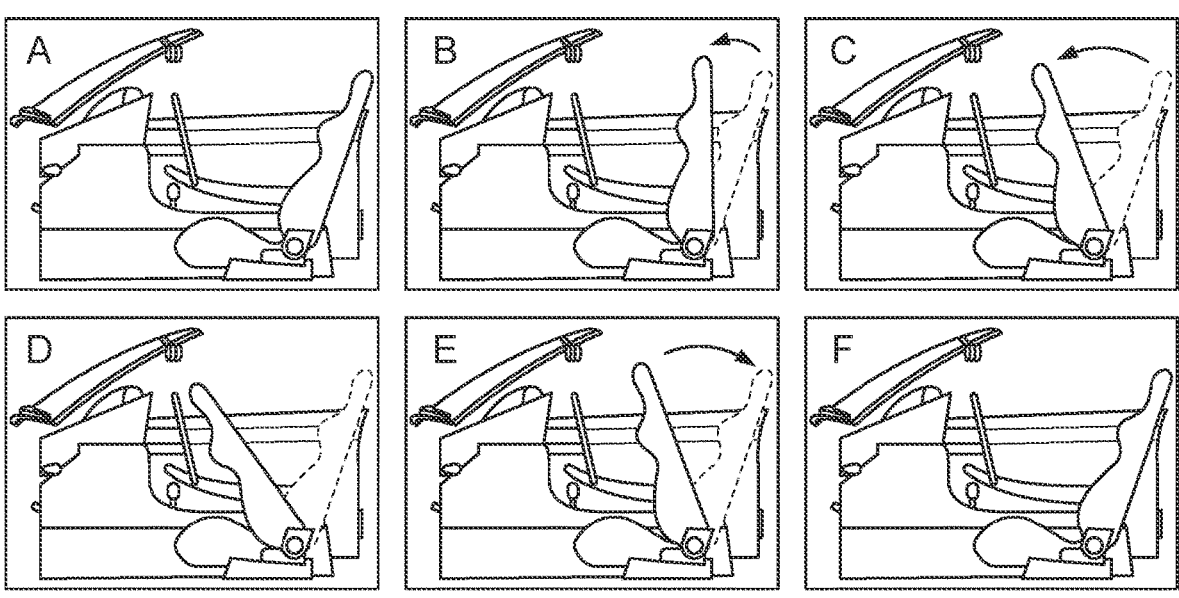
FIG. 13A is an illustration of the motion of a potential application for embodiment dampeners that is replicated in the tests performed for FIGS. 13C-13F.

Referring to FIGS. 13A-13F, description and graphs of testing data for "torque vs rotational angle" of certain example dampeners are shown. In the test examples, certain parameters of the embodiment dampener are varied, and different silicone polymers as described herein are used. FIG. 13A shows an illustration of different motions of a potential application for the dampeners that is replicated in the tests performed for FIGS. 13C-13F. For example, FIG. 13A illustrates the automotive seat at an initial position to a folded position and back to the initial position.

Figure 13B:
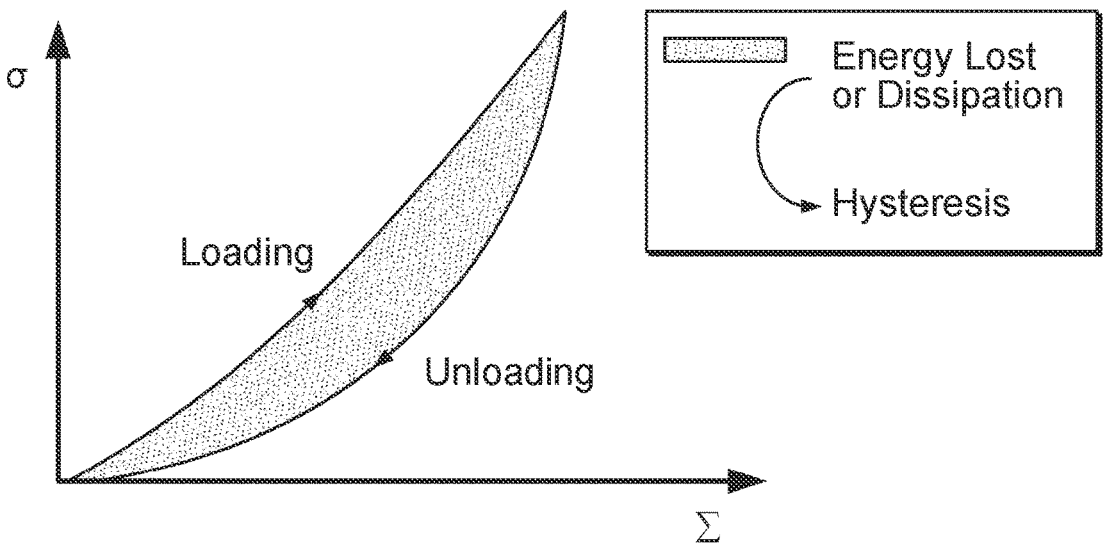
FIG. 13B is a representative graph for "torque vs rotational angle" under loading and unloading conditions.

FIG. 13B shows an exemplary "torque vs rotational angle" curve for a low modulus HCR silicon polymer, for the purpose of illustrating the concept of energy dissipation (e.g. dampening) accomplished via use of the silicone polymer. The exemplary curve shown in FIG. 13B is similar to the actual calculated curves for a low modulus HCR silicon polymer shown in FIGS. 13C-13F. Because the stress strain modulus portion of the curve is curve-shaped (e.g. not straight), the solid silicon copolymer dissipates energy via plastic deformation. This dissipated energy is represented by the colored area between the curves. Thus, the dampener can be designed to utilize the slow slope (low modulus) portion of the curve, or the steep (high modulus) portion of the curve. The result will be different spring rates per orientation amount. The curve of FIG. 13B illustrates how the torque in the loading direction is not the same as the unloading direction, which may be exemplified in the dampener shown in FIGS. 2A-2C and FIGS. 3A-3C. Therefore, the total work (W=FD) to unload the tensile member is less than the work to load the tensile member. The difference in work from plastic deformation results in energy loss or dampening of kinetic energy. Further, the normal force from the tensile member on the rotor, which may be a rotational spring, causes a frictional force which adds to the overall dampening rate.

Figure 13C:
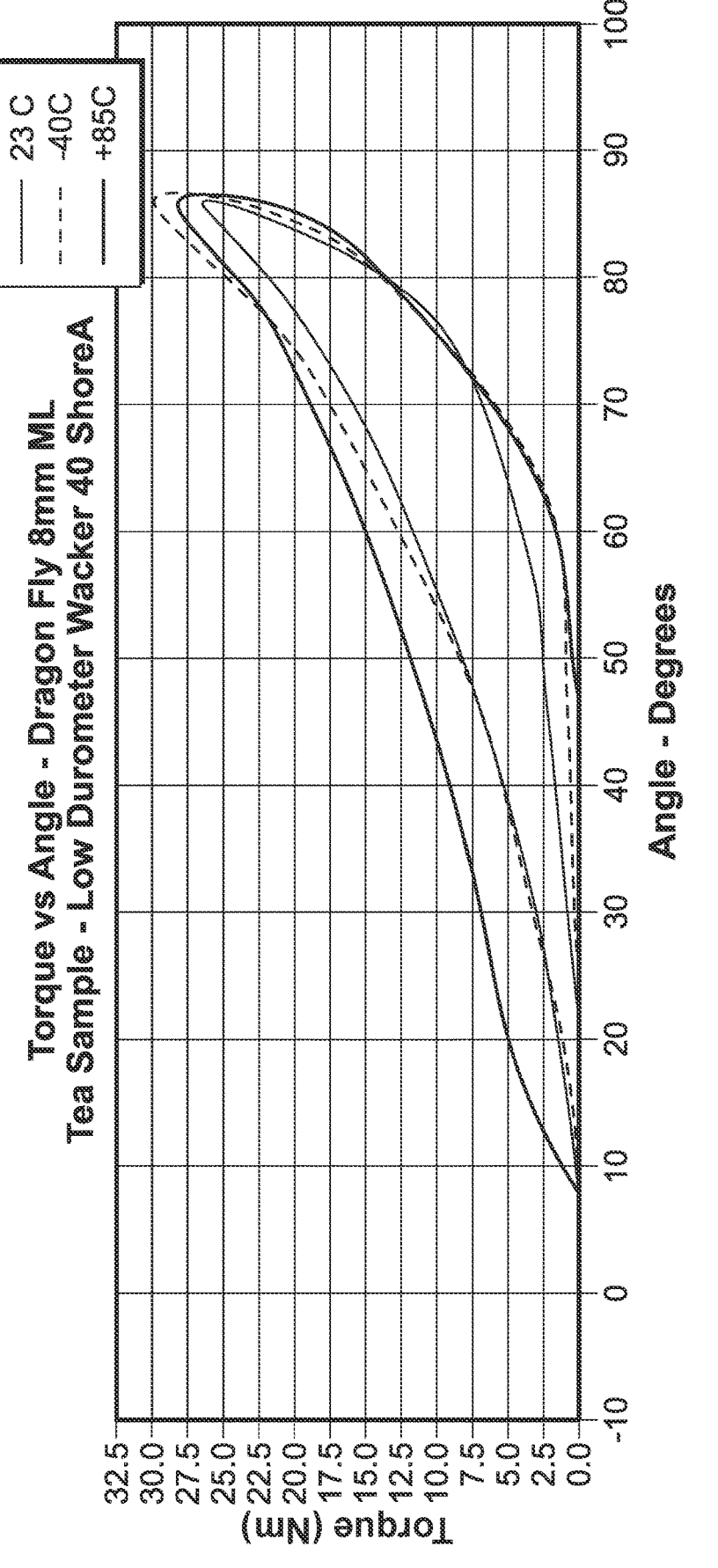
FIG. 13C is a depiction of testing data for "torque vs rotational angle" of certain example dampeners.

FIG. 13C shows a torque vs rotational angle curve for a low-durometer silicone polymer incorporated in an embodiment dampener having a molded length of about 8 millimeters. Due in part to the low durometer of the silicone polymer, the curve has a peak torque of 26-30 Nm, when measured at each three different temperatures (−40° C., 23° C., and 85° C.). The dampener was continuously rotated at 1 RPM while exposed to each temperature. The resulting torque was measured and graphed. As can be seen from the graph, there is minimal deviation between performance (i.e. torque) even between the extreme temperatures. This temperature independence is something new to the to the rotational spring dampening field and is beneficial in a number of applications where a dampener may be exposed to a wide variety of temperatures during performance (for example, in automotive seats, automotive doors, automotive hatchback closures, etc.).

Figure 13D:
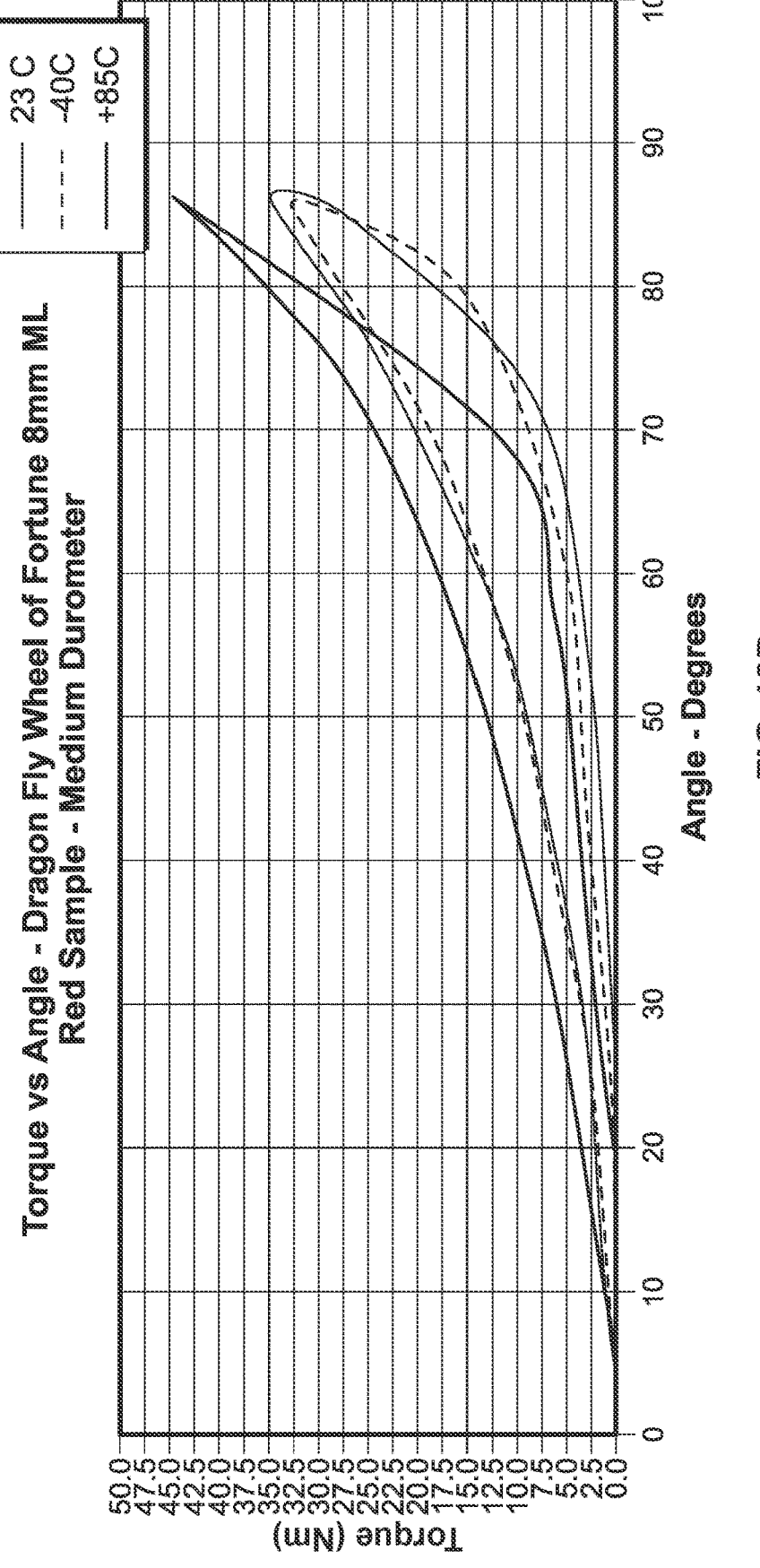
FIG. 13D is a depiction of testing data for "torque vs rotational angle" of certain example dampeners.

FIG. 13D shows a torque vs rotational angle curve for a medium-durometer silicone polymer incorporated in an embodiment dampener having a molded length of about 8 millimeters. Due in part to the slightly increased durometer of the silicone polymer, the curve has a higher peak torque of 32-45 Nm, when measured at each three different temperatures (−40° C., 23° C., and 85° C.). The curve of FIG. 13C also shows minima deviations between the performance of the polymer at the extreme temperatures, except toward that FIG. 13C shows a slightly larger deviation toward the end of travel. Without wishing to be limited by any particular theory, this may relate to the tendency of higher durometer silicones to display more plastic behavior and less elastic behavior, as compared to lower durometer silicones. As a result, the performance of higher-durometer silicones can become somewhat non-Newtonian at high temperature and higher torque, because high temperature materials typically have lower tensile strength. Friction factors may also affect this phenomenon.

Figure 13E:
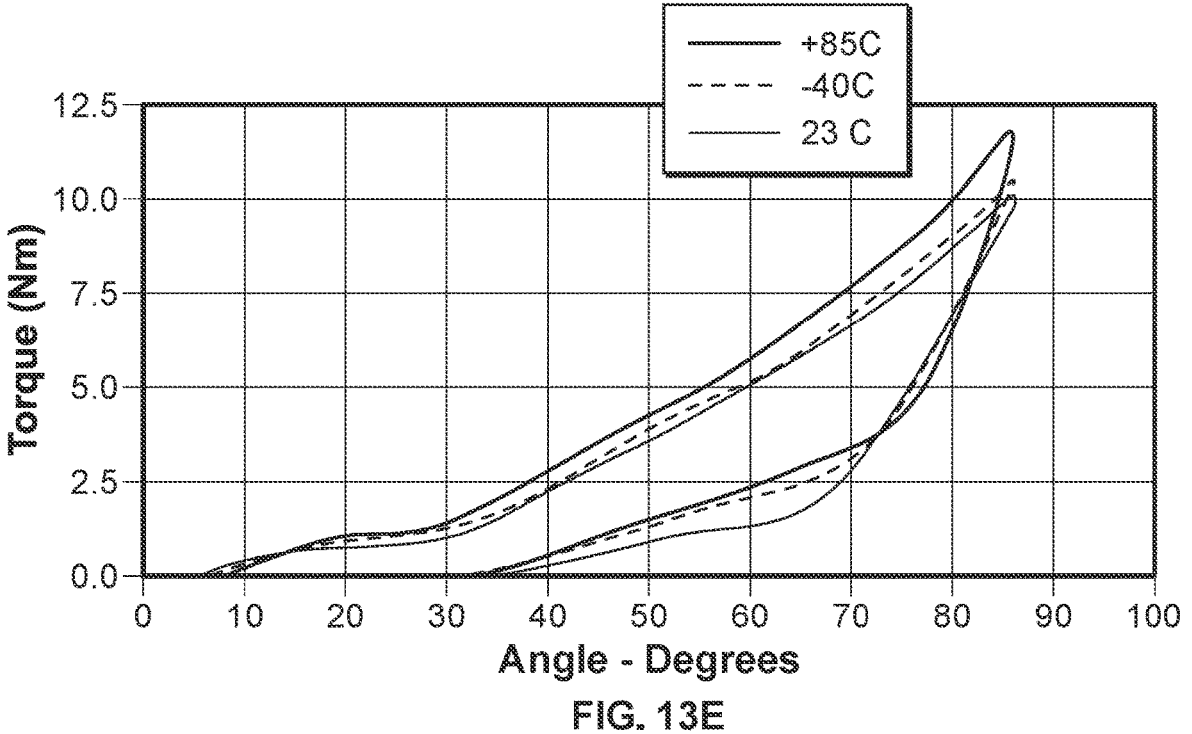
FIG. 13E is a depiction of testing data for "torque vs rotational angle" of certain example dampeners.

FIG. 13E shows a torque vs rotational angle curve for a low-durometer silicone polymer incorporated in an embodiment dampener having a molded length of about 12 millimeters. Due in part to the medium-durometer of the silicone polymer and the longer 12 mm molded length, the curve has a peak torque of 10-11 Nm, when measured at each three different temperatures (−40° C., 23° C., and 85° C.). The dampener was continuously rotated at 1 RPM while exposed to each temperature. The resulting torque was measured and graphed. As can be seen from the graph, there is minimal deviation between performance (i.e. torque) even between the extreme temperatures. Without wishing to be bound by any particular theory, the longer molded length (12 mm) and resulting percent strain on the resin during rotation may contribute to this improved temperature independence for medium durometer silicone.

Figure 13F:
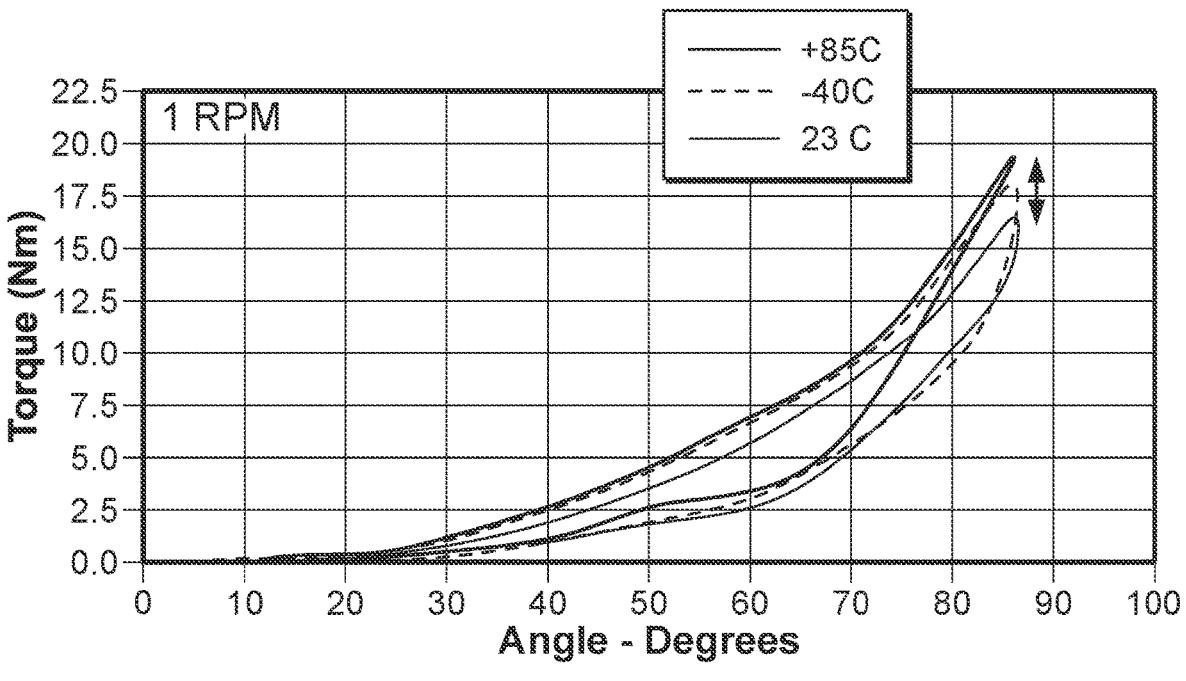
FIG. 13F is depiction of a testing data for "torque vs rotational angle" of certain example dampeners.

FIG. 13F shows a torque vs rotational angle curve for a medium-durometer silicone polymer incorporated in an embodiment dampener having a molded length of about 12 millimeters. Due in part to the low-durometer of the silicone polymer and the longer 12 mm molded length, the curve has a peak torque of 15-18 Nm, when measured at each three different temperatures (−40° C., 23° C., and 85° C.). The dampener was continuously rotated at 1 RPM while exposed to each temperature. The resulting torque was measured and graphed. As can be seen from the graph, there is minimal deviation between performance (i.e. torque) even between the extreme temperatures. Without wishing to be bound by any particular theory, the low durometer material used in the tests graphed in FIG. 13F has the highest friction factor, which may relate to the tension and relax side of the curve (e.g. the "X scale gap") and may be described as friction dampening. The longer molded length (12 mm) and resulting percent strain on the resin during rotation may contribute to this improved temperature independence for medium durometer silicone.

Figure 14:
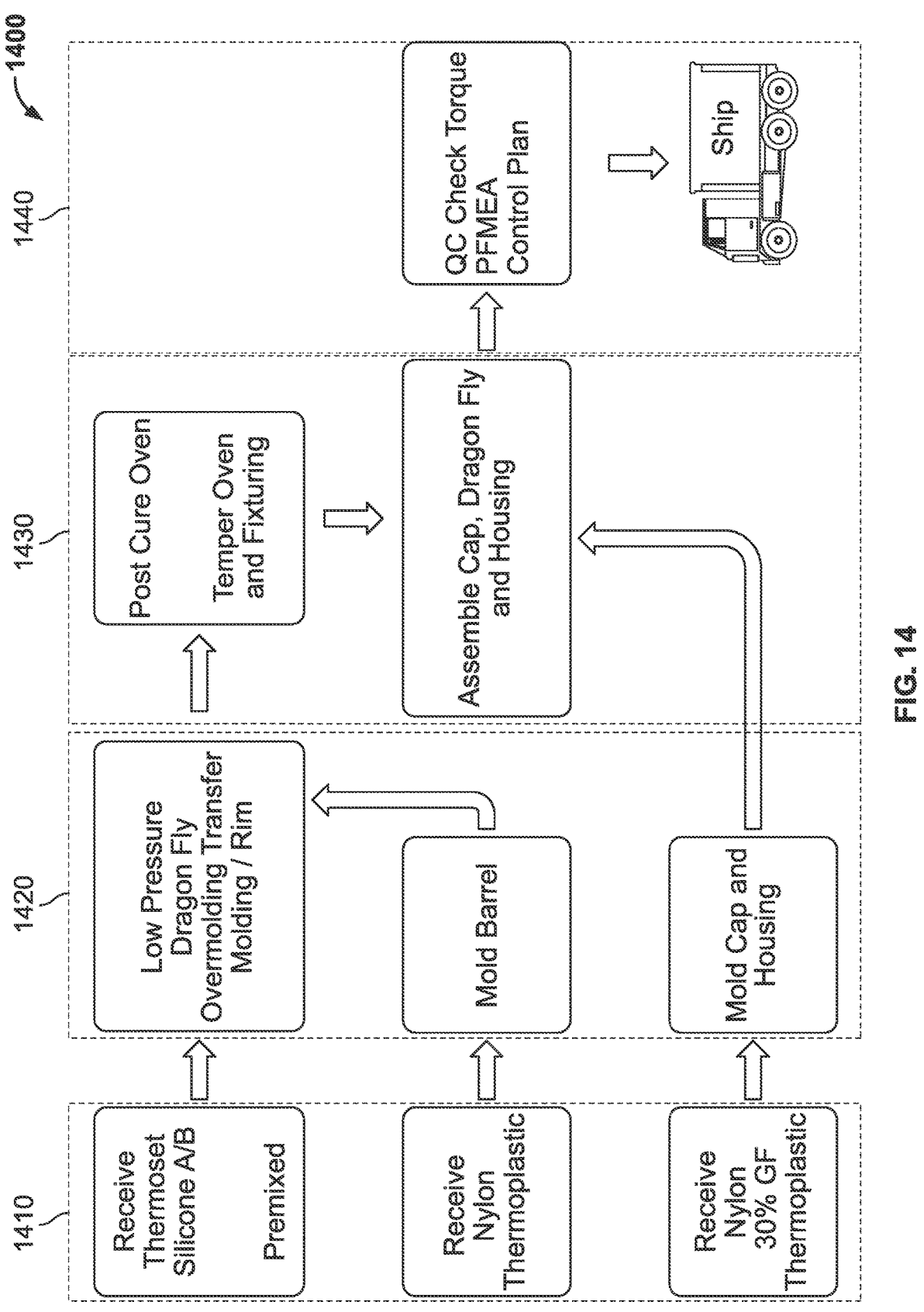
FIG. 14 is a flow chart illustrating a method of manufacturing embodiment dampeners.

Referring to FIG. 14, one non-limiting example of a potential method of manufacturing 1400 an embodiment dampener is shown. As shown in FIG. 14, the tensile member may be molded onto one or more other components of the dampener. As also shown in FIG. 14, one or more solid components may be formed separately from the tensile member, with the tensile member being overmolded onto one or more of these components. The silicone polymer of the tensile member may be crosslinked or otherwise cured after being initially overmolded or extruded onto a solid component of the dampener.

Still referring to FIG. 14, different types of polymers may be used to manufacture different components of the dampener assembly shown in FIGS. 9A-9D or FIGS. 10A-10F. For example, a first step 1410 may include preparing different polymer materials and premixing in a barrel before being extruded into a mold. A second step 1420 may include molding different components of the dampener assembly. A third step 1430 may include assembling different components to form the dampener assembly. A fourth step 1440 may include checking desired torque of the dampener assembly.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

While the device disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Throughout the disclosure, the terms "about" and "approximately" mean plus or minus 5% of the number that each term precedes.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative embodiments of the present disclosure. The claims are to be construed to include alternative embodiments to the extent permitted by the prior art.

Various features of the disclosure are set forth in the following claims.

We claim:

1. A rotational spring dampener, comprising:
a core comprising an opening therethrough;
a first solid component comprising a first set of bosses;
a second solid component comprising a second set of bosses; and
a tensile member positioned between the first solid component and the second solid component, and
wherein the tensile member comprises a solid silicon polymer.

2. The rotational spring dampener of claim 1, wherein the tensile member consists of a solid silicon polymer.

3. The rotational spring dampener of claim 2, wherein the tensile member is separate from and is not connected to the first solid component,
wherein the tensile member is separate from and is not connected to the second solid component, and
wherein the tensile member is in direct and simultaneous contact with both the first solid component and the second solid component.

4. The rotational spring dampener of claim 1, wherein the tensile member comprises a plurality of elongated bands.

5. The rotational spring dampener of claim 4, wherein the tensile member comprises a plurality of voids extending therethrough.

6. The rotational spring dampener of claim 5, wherein the first solid component is configured such that at least one boss of the first set of bosses extends through at least one void of the tensile member.

7. The rotational spring dampener of claim 5, wherein the second solid component is configured such that at least one boss of the second set of bosses extends through at least one void of the tensile member.

8. The rotational spring dampener of claim 5, wherein the first solid component is configured such that at least one boss of the first set of bosses extends through at least one void of the tensile member, and wherein the second solid component is configured such that at least one boss of the second set of bosses extends through the same void of the tensile member as at least one boss of the first set of bosses.

9. The rotational spring dampener of claim 8, wherein the first solid component is configured such that each boss of the first set of bosses extends through a void of the tensile member, and wherein the second solid component is configured such that each boss of the second set of bosses extends through the same void of the tensile member as each boss of the first set of bosses.

10. The rotational spring dampener of claim 9, wherein each void of the tensile member has at least one boss of the first set of bosses and at least one boss of the second set of bosses extending therethrough.

11. The rotational spring dampener of claim 1, wherein the first solid component is a single unitary piece that comprises each boss of the first set of bosses, and wherein and the second solid component is a single unitary piece that comprises each boss of the second set of bosses.

12. The rotational spring dampener of claim 1, wherein the first solid component and the second solid component each consist of a polymeric material selected from the group consisting of polyvinylchloride (PVC), high-density polyethylene (HDPE), fluoroplastics, polyamides, polyethylene terephthalate (PET), polybutylene terephthalate (PBT), and polyoxymethylene (POM).

13. The rotational spring dampener of claim 1, wherein the rotational spring dampener has a torque resistance from 2,000 Ncm to 10,000 Ncm.

14. The rotational spring dampener of claim 1, wherein the solid silicone polymer has a yield strength from about 2 MPa to about 15 MPa, as measured according to ASTM D638.

15. The rotational spring dampener of claim 1, wherein the solid silicone polymer has a percent-elongation-to-break from about 100% to about 2000%, as measured according to ASTM D638.

16. The rotational spring dampener of claim 1, further comprising a free-run feature.

17. A rotational spring dampener assembly, comprising:
a cap including a cap opening;
a base plate including a base plate opening; and
a dampener, the dampener placed between the cap and the base plate, the dampener comprising:
a core comprising an opening therethrough;
a first solid component comprising a first set of bosses;
a second solid component comprising a second set of bosses; and
a tensile member positioned between the first solid component and the second solid component,
wherein the tensile member comprises a solid silicon polymer, and
wherein the cap opening, the opening, and the base plate opening are concentric about a longitudinal axis.

18. The rotational spring dampener assembly of claim 17, wherein the base plate includes a plurality of securing openings and the second solid component including a plurality of securing members protruding outwardly from the second solid component, wherein the plurality of securing members are received by the plurality of securing openings.

\* \* \* \* \*